US012425284B2

(12) United States Patent
He

(10) Patent No.: US 12,425,284 B2
(45) Date of Patent: Sep. 23, 2025

(54) METHOD AND APPARATUS FOR DETERMINING MINIMUM SLOT OFFSET VALUE

(71) Applicant: Honor Device Co., Ltd., Shenzhen (CN)

(72) Inventor: Yanzhao He, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 53 days.

(21) Appl. No.: 18/027,683

(22) PCT Filed: Mar. 16, 2022

(86) PCT No.: PCT/CN2022/081223
§ 371 (c)(1),
(2) Date: Mar. 22, 2023

(87) PCT Pub. No.: WO2022/227906
PCT Pub. Date: Nov. 3, 2022

(65) Prior Publication Data
US 2023/0388170 A1    Nov. 30, 2023

(30) Foreign Application Priority Data

Apr. 29, 2021  (CN) .......................... 202110488992.7

(51) Int. Cl.
*H04L 27/26* (2006.01)
*H04W 72/0446* (2023.01)
*H04W 72/542* (2023.01)
(52) U.S. Cl.
CPC ..... *H04L 27/2621* (2013.01); *H04W 72/0446* (2013.01); *H04W 72/542* (2023.01)
(58) Field of Classification Search
CPC ............ H04L 27/2621; H04W 72/542; H04W 72/0446
See application file for complete search history.

(56) References Cited

U.S. PATENT DOCUMENTS

2021/0105716 A1    4/2021    Wu et al.
2022/0022137 A1    1/2022    Xue et al.
(Continued)

FOREIGN PATENT DOCUMENTS

CN    111757434 A    10/2020
CN    111757435 A    10/2020
(Continued)

OTHER PUBLICATIONS

Qualcomm Inc., "Cross-slot scheduling power saving techniques", 3GPP TSG-RAN WG1 #98bis, R1-1911130, Chongqing, China, Oct. 14-20, 2019, 18 pages.
(Continued)

*Primary Examiner* — Melvin C Marcelo
(74) *Attorney, Agent, or Firm* — Slater Matsil, LLP

(57) ABSTRACT

A method and an apparatus for determining a minimum slot offset value is provided. The method is as follows: The terminal device determines whether a preset condition is met. The preset condition includes at least one of the following cases: a preset application is opened, a related parameter of the terminal device changes, data packet sparsity changes, or a network environment parameter changes. The terminal device determines a minimum slot offset value in response to the preset condition being met. If the minimum slot offset value determined by the terminal device is different from a minimum slot offset value indicated by a cell on which the terminal device currently camps, the terminal device sends auxiliary information, where the auxiliary information includes the minimum slot offset value determined by the terminal device, and the minimum slot offset value is used for cross-slot scheduling.

20 Claims, 14 Drawing Sheets

(56) References Cited

U.S. PATENT DOCUMENTS

| | | |
|---|---|---|
| 2022/0022174 A1 | 1/2022 | Xue et al. |
| 2022/0159702 A1 | 5/2022 | Seo et al. |
| 2022/0167266 A1 | 5/2022 | Nimbalker et al. |
| 2022/0217579 A1 | 7/2022 | Seo et al. |
| 2022/0232478 A1 | 7/2022 | Huang et al. |
| 2022/0346068 A1 | 10/2022 | Nimbalker et al. |

FOREIGN PATENT DOCUMENTS

| | | | | |
|---|---|---|---|---|
| CN | 111885684 A | | 11/2020 | |
| CN | 112616187 A | | 4/2021 | |
| CN | 113382460 A | | 9/2021 | |
| CN | 116114293 A | * | 5/2023 | ............ H04W 24/10 |
| CN | 116114334 A | * | 5/2023 | ........ H04W 52/0229 |
| WO | 2020145865 A1 | | 7/2020 | |
| WO | 2020155166 A1 | | 8/2020 | |
| WO | 2020200075 A1 | | 10/2020 | |
| WO | 2020204464 A1 | | 10/2020 | |
| WO | 2020204495 A1 | | 10/2020 | |
| WO | 2021030939 A1 | | 2/2021 | |
| WO | 2021032514 A1 | | 2/2021 | |
| WO | 2021062612 A1 | | 4/2021 | |

OTHER PUBLICATIONS

Moderator (AT&T), "Summary of UE features for UE power savings", 3GPP TSG RAN WG1 #101, R1-2004286, e-Meeting, May 25-Jun. 5, 2020, 11 pages.

* cited by examiner

| PDCCH | PDSCH | PDSCH | PDSCH | PDSCH | PDSCH | PDSCH | PDSCH | PDSCH | PDSCH | PDSCH | PDSCH | PDSCH | PDSCH |
|---|---|---|---|---|---|---|---|---|---|---|---|---|---|

Symbol 1 2 3 4 5 6 7 8 9 10 11 12 13 14

FIG. 1

METHOD AND APPARATUS FOR DETERMINING MINIMUM SLOT OFFSET VALUE

CROSS-REFERENCE TO RELATED APPLICATIONS

This application is a national stage of International Application No. PCT/CN2022/081223, filed on Mar. 16, 2022, which claims priority to Chinese Patent Application No. 202110488992.7, filed on Apr. 29, 2021. The disclosures of both of the aforementioned applications are hereby incorporated by reference in their entireties.

TECHNICAL FIELD

This application relates to the field of terminals, and in particular, to a method and an apparatus for determining a minimum slot offset value.

BACKGROUND

In the fifth generation (5th generation, 5G) mobile communications system new radio (new radio, NR), a time interval between a physical downlink control channel (physical downlink control channel, PDCCH) used to carry scheduling information and a physical downlink shared channel (physical downlink shared channel, PDSCH) that is corresponding to the PDCCH and that is used to carry downlink data is dynamically indicated by a base station. The time interval between the PDCCH and the corresponding PDSCH may be represented by using a K0 value (in the unit of slot (slot)). The K0 value may be corresponding to a value set, and the value set is configured by the base station by using RRC signaling. In one scheduling, the base station may indicate a value in a value set of the K0 value in the PDCCH. If the K0 value=0, it indicates that the PDCCH and the PDSCH are in a same slot, which is referred to as "same-slot scheduling". If the K0 value is greater than 0, it indicates that the PDCCH and the PDSCH are not in a same slot, which is referred to as "cross-slot scheduling".

It should be noted that, same-slot scheduling may cause power consumption. For example, in a same-slot scheduling scenario, if the current slot is PDCCH only slot, that is, no PDSCH is transmitted in the current slot, it is a waste of power that the UE still enables a downlink receive antenna during DCI demodulation. Generally, cross-slot scheduling can avoid buffering some useless data, so energy saving can be achieved. However, during cross-slot scheduling, data needs to be buffered on the base station side. The buffered data affects a scheduling delay. For example, in a time division duplexing (time division duplexing, TDD) system, a delay caused by cross-slot scheduling is relatively large due to an uplink-downlink configuration problem.

In conclusion, how to perform same-slot scheduling and cross-slot scheduling to obtain a balance between saving power consumption and reducing a delay is an urgent problem to be solved.

SUMMARY

Embodiments of this application provide a method and an apparatus for determining a minimum slot offset value, so as to flexibly and intelligently determine a minimum slot offset value, determine, based on the minimum slot offset value, whether to perform same-slot scheduling or cross-slot scheduling, and obtain a balance between saving power consumption and reducing a delay.

According to a first aspect, an embodiment of this application provides a method for determining a minimum slot offset value, including: determining, by a terminal device, whether a preset condition is met, where the preset condition includes at least one of the following cases: a preset application is opened, a related parameter of the terminal device changes, data packet sparsity changes, or a network environment parameter changes; determining, by the terminal device, a minimum slot offset value in response to the preset condition being met; and if the minimum slot offset value determined by the terminal device is different from a minimum slot offset value indicated by a cell on which the terminal device currently camps, sending, by the terminal device, assistance information, where the assistance information includes the minimum slot offset value determined by the terminal device, and the minimum slot offset value is used for cross-slot scheduling; where the related parameter of the terminal device includes at least one of a parameter indicating whether a screen of the terminal device is on or off, a parameter indicating whether the terminal device is being charged, a working mode of the terminal device, remaining battery power of the terminal device, a power loss speed of the terminal device, a network parameter that affects power consumption of the terminal device, and a temperature of the terminal device.

Based on the method provided in this embodiment of this application, in response to meeting the preset condition, the terminal device may determine the minimum slot offset value, and report the minimum slot offset value to the network device. Therefore, the network device may determine, based on the minimum slot offset value, whether to perform same-slot scheduling or cross-slot scheduling, thereby obtaining a balance between saving power consumption and reducing a delay. In a case in which the delay has a minimum effect on user experience, a lower power consumption is obtained.

In a possible implementation, the data packet sparsity is used to indicate a quantity of uplink and downlink packets and/or uplink and downlink bytes transmitted at an application layer per second; or the data packet sparsity is used to indicate a quantity of uplink and downlink physical address layer user packet data units and/or a quantity of physical address layer bytes transmitted every 100 milliseconds at a physical address layer; or the data packet sparsity is used to indicate a quantity of downlink scheduling times transmitted at a physical layer every 100 milliseconds; and the network environment parameter includes one or more of reference signal received power (reference signal received power, RSRP), a signal to interference plus noise ratio (signal to interference plus noise ratio, SINR), and reference signal received quality (reference signal received quality, RSRQ). It should be noted that the data packet sparsity may also be another definition manner. For example, the data packet sparsity may be used to indicate a quantity of uplink and downlink physical address layer user packet data units and/or a quantity of physical address layer bytes transmitted every 10 milliseconds. For another example, the data packet sparsity may be used to indicate a quantity of uplink and downlink packets and/or uplink and downlink bytes transmitted at the application layer every 10 seconds, which is not limited in this application.

In a possible implementation, if the preset condition includes that the preset application is opened, the determining, by the terminal device, a minimum slot offset value in response to the preset condition being met includes: determining, by the terminal device, the minimum slot offset value based on an application type corresponding to the preset application, where the application type includes a first type and a second type, the first type is corresponding to an application for a first delay requirement, the second type is corresponding to an application for a second delay requirement, and the first delay requirement is higher than the second delay requirement; and when the type of the first application is the first type, determining that the minimum slot offset value is equal to 0; or when the type of the first application is the second type, determining that the minimum slot offset value is greater than 0. For example, an application corresponding to level 0 requires an ultra-low delay, and is sensitive to the delay. An application corresponding to level 1 requires a common low delay, and is relatively insensitive to the delay. When the UE runs the application corresponding to the level 0, a minimum K0 value expected by the UE may be 0. When the UE runs the application corresponding to the level 1, a minimum K0 value expected by the UE may be non-0. In this way, a delay requirement of an application running in the foreground of the terminal device can be met.

In a possible implementation, if the preset condition includes that the preset application is opened, the determining, by the terminal device, a minimum slot offset value in response to the preset condition being met includes: determining whether the preset application has a corresponding historical learning result, where the historical learning result is used to indicate a minimum slot offset value corresponding to a latest running time of the preset application; if the preset application does not have a corresponding historical learning result, setting a first slot offset value and a second slot offset value, recording a delay indicator corresponding to the first slot offset value in a time T and a delay indicator corresponding to the second slot offset value in the time T; determining whether a first ratio is less than a preset first threshold, where the first ratio is a ratio of a difference between absolute values of the delay indicator corresponding to the first slot offset value and the delay indicator corresponding to the second slot offset value to a smaller value of the delay indicator corresponding to the first slot offset value and the delay indicator corresponding to the second slot offset value; and if the first ratio is less than the preset first threshold, determining that the minimum slot offset value is greater than 0; or if the first ratio is greater than or equal to the preset first threshold, determining that the minimum slot offset value is equal to 0. When the first ratio is less than the preset first threshold, it indicates that a deviation between the delay indicator corresponding to the first slot offset value and the delay indicator corresponding to the second slot offset value is relatively small, and it may be inferred that the foreground APP is insensitive to a delay of cross-slot scheduling. To save power consumption, a value of the expected K0 (that is, a minimum K0 value expected by the UE) of the foreground APP may be set to a non-zero value; otherwise, the value of the expected K0 is set to 0. In this way, a delay requirement of an application running in the foreground of the terminal device can be met.

In a possible implementation, if the preset condition includes that the related parameter of the terminal device changes, the determining, by the terminal device, a minimum slot offset value in response to the preset condition being met includes: determining, by the terminal device, the minimum slot offset value based on the parameter indicating whether the screen of the terminal device is on or off, and if the screen of the terminal device is off, determining that the minimum slot offset value is greater than 0, or if the screen of the terminal device is on, determining that the minimum slot offset value is equal to 0; or determining, by the terminal device, the minimum slot offset value based on the parameter indicating whether the terminal device is being charged, and if the terminal device is being charged, determining that the minimum slot offset value is equal to 0; or determining, by the terminal device, the minimum slot offset value based on the working mode of the terminal device, and if the terminal device is in a low-power mode or a low-power-consumption mode, determining that the minimum slot offset value is greater than 0, or if the terminal device is in a performance mode, determining that the minimum slot offset value is equal to 0; or determining, by the terminal device, the minimum slot offset value based on the remaining battery power of the terminal device, and if the remaining battery power of the terminal device is less than a second threshold, determining that the minimum slot offset value is greater than 0, or if the remaining battery power of the terminal device is greater than a third threshold, determining that the minimum slot offset value is equal to 0; or determining, by the terminal device, the minimum slot offset value based on the power loss speed of the terminal device, and if the power loss speed of the terminal device is greater than a fourth threshold, determining that the minimum slot offset value is greater than 0, or if the power loss speed of the terminal device is less than a fifth threshold, determining that the minimum slot offset value is equal to 0; or determining, by the terminal device, the minimum slot offset value based on the network parameter that affects power consumption of the terminal device; and if a first condition is met, determining that the minimum slot offset value is greater than 0, where the first condition includes at least one of the following cases: a current network supports BWP, a current network supports CDRX, and an uplink pre-scheduling ratio is less than a sixth threshold; or if the first condition is not met, determining that the minimum slot offset value is equal to 0; or determining, by the terminal device, the minimum slot offset value based on the temperature of the terminal device, and if the temperature of the terminal device is greater than a seventh threshold, determining that the minimum slot offset value is greater than 0; or determining, by the terminal device, the minimum slot offset value based on the parameter indicating whether the screen of the terminal device is on or off and the working mode of the terminal device; and if the screen of the terminal device is off and the terminal device is in a low-power mode or a low-power-consumption mode, determining that the minimum slot offset value is greater than 0; or if the screen of the terminal device is on and the terminal device is in a performance mode, determining that the minimum slot offset value is equal to 0; or determining, by the terminal device, the minimum slot offset value based on the parameter indicating whether the screen of the terminal device is on or off, the working mode of the terminal device, and the remaining battery power of the terminal device; and if the screen of the terminal device is off, the terminal device is in a low-power mode or a low-power-consumption mode, and the remaining battery power of the terminal device is less than a second threshold, determining that the minimum slot offset value is greater than 0; or if the screen of the terminal device is on, the terminal device is in a performance mode, and the remaining battery power of the terminal device is greater than a third threshold, determining that the minimum slot offset value is equal to 0. In this way, a delay requirement posed after a related parameter of the terminal device changes can be met.

In a possible implementation, if the preset condition includes a packet sparsity change, that the terminal device determines a minimum slot offset value in response to meeting the preset condition includes: when the data packet sparsity is used to indicate a quantity of uplink and downlink packets transmitted at the application layer per second and/or a quantity of uplink and downlink bytes per second, if the quantity of uplink and downlink packets transmitted per second is less than an eighth threshold and the quantity of uplink and downlink bytes per second is less than a ninth threshold, determining that the minimum slot offset value is greater than 0; or if the quantity of uplink and downlink packets transmitted per second is greater than a tenth threshold or the quantity of uplink and downlink packets transmitted per second is greater than an eleventh threshold, determining that the minimum slot offset value is equal to 0; or when the data packet sparsity is used to indicate a quantity of uplink and downlink physical address layer user packet data units and/or a quantity of uplink and downlink physical address layer bytes transmitted every 100 milliseconds at the physical address layer, if the quantity of uplink and downlink physical address layer user packet data units transmitted every 100 milliseconds is less than a twelfth threshold, and the quantity of uplink and downlink physical address layer bytes transmitted every 100 milliseconds is less than a thirteenth threshold, determining that the minimum slot offset value is greater than 0; or if the quantity of uplink and downlink physical address layer user packet data units transmitted every 100 milliseconds is greater than a fourteenth threshold, or the quantity of uplink and downlink physical address layer bytes transmitted every 100 milliseconds is greater than a fifteenth threshold, determining that the minimum slot offset value is equal to 0; or when the data packet sparsity is used to indicate a quantity of downlink scheduling times transmitted at the physical layer every 100 milliseconds, if the quantity of downlink scheduling times transmitted every 100 milliseconds is less than a sixteenth threshold, determining that the minimum slot offset value is greater than 0; or if the quantity of downlink scheduling times transmitted every 100 milliseconds is greater than a seventeenth threshold, determining that the minimum slot offset value is equal to 0. In this way, a delay requirement posed after the data packet sparsity changes can be met.

In a possible implementation, if the preset condition includes that the network environment parameter changes, the determining, by the terminal device, a minimum slot offset value in response to the preset condition being met includes: when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, and a variation amplitude of the RSRQ is greater than a twenty-third threshold, determining that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, and a variation amplitude of the RSRQ is less than a twenty-ninth threshold, determining that the minimum slot offset value is greater than 0. In this way, a delay requirement posed after the network environment parameter is changed can be met.

In a possible implementation, before the sending, by the terminal device, assistance information, the method further includes: receiving, by the terminal device, a capability query message sent by a network device, where the capability query message is used to query a capability of the terminal device; sending, by the terminal device, capability information to the network device, where the capability information includes information used to indicate that the terminal device supports cross-slot scheduling; and receiving, by the terminal device, a radio resource control RRC reconfiguration message from the network device, where the RRC reconfiguration message includes an information element used to enable a capability of the terminal device to modify a minimum slot offset value.

In a possible implementation, the minimum slot offset value determined by the terminal device includes a minimum K0 value. The minimum K0 value is used to indicate a time interval between the PDCCH and the PDSCH scheduled by the PDCCH.

According to a second aspect, an embodiment of this application provides a terminal device. The terminal device includes a wireless communications module, a memory, and one or more processors, and the wireless communications module, the memory, and the processor are coupled. The memory is configured to store computer program code, and the computer program code includes computer instructions. When the computer instructions are executed by the processor, the terminal device performs the following steps: determining whether a preset condition is met, where the preset condition includes at least one of the following cases: a preset application is opened, a related parameter of the terminal device changes, data packet sparsity changes, or a network environment parameter changes; determining a minimum slot offset value in response to the preset condition being met; and if the minimum slot offset value determined by the terminal device is different from a minimum slot offset value indicated by a cell on which the terminal device currently camps, sending assistance information, where the assistance information includes the minimum slot offset value determined by the terminal device, and the minimum slot offset value is used for cross-slot scheduling; where the related parameter of the terminal device includes at least one of a parameter indicating whether a screen of the terminal device is on or off, a parameter indicating whether the terminal device is being charged, a working mode of the terminal device, remaining battery power of the terminal device, a power loss speed of the terminal device, a network parameter that affects power consumption of the terminal device, and a temperature of the terminal device.

In a possible implementation, the data packet sparsity is used to indicate a quantity of uplink and downlink packets and/or uplink and downlink bytes transmitted at an application layer per second; or the data packet sparsity is used to indicate a quantity of uplink and downlink physical address layer user packet data units and/or a quantity of uplink and downlink physical address layer bytes transmitted every 100 milliseconds at a physical address layer; or the data packet sparsity is used to indicate a quantity of downlink scheduling times transmitted at a physical layer every 100 milliseconds; and the network environment parameter includes one or more of reference signal received power RSRP, a signal to interference plus noise ratio SINR, and reference signal received quality RSRQ.

In a possible implementation, if the preset condition includes that the preset application is opened, the determining, by the terminal device, a minimum slot offset value in response to the preset condition being met includes: determining, by the terminal device, the minimum slot offset value based on an application type corresponding to the preset application, where the application type includes a first type and a second type, the first type is corresponding to an application for a first delay requirement, the second type is corresponding to an application for a second delay requirement, and the first delay requirement is higher than the second delay requirement; and when the type of the first application is the first type, determining that the minimum slot offset value is equal to 0; or when the type of the first application is the second type, determining that the minimum slot offset value is greater than 0.

In a possible implementation, if the preset condition includes that the preset application is opened, the determining, by the terminal device, a minimum slot offset value in response to the preset condition being met includes: determining whether the preset application has a corresponding historical learning result, where the historical learning result is used to indicate a minimum slot offset value corresponding to a latest running time of the preset application; if the preset application does not have a corresponding historical learning result, setting a first slot offset value and a second slot offset value, recording a delay indicator corresponding to the first slot offset value in a time T and a delay indicator corresponding to the second slot offset value in the time T; determining whether a first ratio is less than a preset first threshold, where the first ratio is a ratio of a difference between absolute values of the delay indicator corresponding to the first slot offset value and the delay indicator corresponding to the second slot offset value to a smaller value of the delay indicator corresponding to the first slot offset value and the delay indicator corresponding to the second slot offset value; and if the first ratio is less than the preset first threshold, determining that the minimum slot offset value is greater than 0; or if the first ratio is greater than or equal to the preset first threshold, determining that the minimum slot offset value is equal to 0.

In a possible implementation, if the preset condition includes that the related parameter of the terminal device changes, the determining, by the terminal device, a minimum slot offset value in response to the preset condition being met includes: determining, by the terminal device, the minimum slot offset value based on the parameter indicating whether the screen of the terminal device is on or off, and if the screen of the terminal device is off, determining that the minimum slot offset value is greater than 0, or if the screen of the terminal device is on, determining that the minimum slot offset value is equal to 0; or determining, by the terminal device, the minimum slot offset value based on the parameter indicating whether the terminal device is being charged, and if the terminal device is being charged, determining that the minimum slot offset value is equal to 0; or determining, by the terminal device, the minimum slot offset value based on the working mode of the terminal device, and if the terminal device is in a low-power mode or a low-power-consumption mode, determining that the minimum slot offset value is greater than 0, or if the terminal device is in a performance mode, determining that the minimum slot offset value is equal to 0; or determining, by the terminal device, the minimum slot offset value based on the remaining battery power of the terminal device, and if the remaining battery power of the terminal device is less than a second threshold, determining that the minimum slot offset value is greater than 0, or if the remaining battery power of the terminal device is greater than a third threshold, determining that the minimum slot offset value is equal to 0; or determining, by the terminal device, the minimum slot offset value based on the power loss speed of the terminal device, and if the power loss speed of the terminal device is greater than a fourth threshold, determining that the minimum slot offset value is greater than 0, or if the power loss speed of the terminal device is less than a fifth threshold, determining that the minimum slot offset value is equal to 0; or determining, by the terminal device, the minimum slot offset value based on the network parameter that affects power consumption of the terminal device; and if a first condition is met, determining that the minimum slot offset value is greater than 0, where the first condition includes at least one of the following cases: a current network supports BWP, a current network supports CDRX, and an uplink pre-scheduling ratio is less than a sixth threshold; or if the first condition is not met, determining that the minimum slot offset value is equal to 0; or determining, by the terminal device, the minimum slot offset value based on the temperature of the terminal device, and if the temperature of the terminal device is greater than a seventh threshold, determining that the minimum slot offset value is greater than 0; or determining, by the terminal device, the minimum slot offset value based on the parameter indicating whether the screen of the terminal device is on or off and the working mode of the terminal device; and if the screen of the terminal device is off and the terminal device is in a low-power mode or a low-power-consumption mode, determining that the minimum slot offset value is greater than 0; or if the screen of the terminal device is on and the terminal device is in a performance mode, determining that the minimum slot offset value is equal to 0; or determining, by the terminal device, the minimum slot offset value based on the parameter indicating whether the screen of the terminal device is on or off, the working mode of the terminal device, and the remaining battery power of the terminal device; and if the screen of the terminal device is off, the terminal device is in a low-power mode or a low-power-consumption mode, and the remaining battery power of the terminal device is less than a second threshold, determining that the minimum slot offset value is greater than 0; or if the screen of the terminal device is on, the terminal device is in a performance mode, and the remaining battery power of the terminal device is greater than a third threshold, determining that the minimum slot offset value is equal to 0.

In a possible implementation, if the preset condition includes a packet sparsity change, that the terminal device determines a minimum slot offset value in response to meeting the preset condition includes: when the data packet sparsity is used to indicate a quantity of uplink and downlink packets transmitted at the application layer per second and/or a quantity of uplink and downlink bytes per second, if the quantity of uplink and downlink packets transmitted per second is less than an eighth threshold and the quantity of uplink and downlink bytes per second is less than a ninth threshold, determining that the minimum slot offset value is greater than 0; or if the quantity of uplink and downlink packets transmitted per second is greater than a tenth threshold or the quantity of uplink and downlink packets transmitted per second is greater than an eleventh threshold, determining that the minimum slot offset value is equal to 0; or when the data packet sparsity is used to indicate a quantity of uplink and downlink physical address layer user packet data units and/or a quantity of uplink and downlink physical address layer bytes transmitted every 100 milliseconds at the physical address layer, if the quantity of uplink and downlink physical address layer user packet data units transmitted every 100 milliseconds is less than a twelfth threshold, and the quantity of uplink and downlink physical address layer bytes transmitted every 100 milliseconds is less than a thirteenth threshold, determining that the minimum slot offset value is greater than 0; or if the quantity of uplink and downlink physical address layer user packet data units transmitted every 100 milliseconds is greater than a fourteenth threshold, or the quantity of uplink and downlink physical address layer bytes transmitted every 100 milliseconds is greater than a fifteenth threshold, determining that the minimum slot offset value is equal to 0; or when the data packet sparsity is used to indicate a quantity of downlink scheduling times transmitted at the physical layer every 100 milliseconds, if the quantity of downlink scheduling times transmitted every 100 milliseconds is less than a sixteenth threshold, determining that the minimum slot offset value is greater than 0; or if the quantity of downlink scheduling times transmitted every 100 milliseconds is greater than a seventeenth threshold, determining that the minimum slot offset value is equal to 0.

In a possible implementation, if the preset condition includes that the network environment parameter changes, the determining, by the terminal device, a minimum slot offset value in response to the preset condition being met includes: when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, and a variation amplitude of the RSRQ is greater than a twenty-third threshold, determining that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, and a variation amplitude of the RSRQ is less than a twenty-ninth threshold, determining that the minimum slot offset value is greater than 0.

In a possible implementation, before the terminal device sends the assistance information, the terminal device further performs the following steps: receiving a capability query message sent by a network device, where the capability query message is used to query a capability of the terminal device; sending capability information to the network device, where the capability information includes information used to indicate that the terminal device supports cross-slot scheduling; and receiving a radio resource control RRC reconfiguration message from the network device, where the RRC reconfiguration message includes an information element used to enable a capability of the terminal device to modify a minimum slot offset value.

In a possible implementation, the minimum slot offset value determined by the terminal device includes a minimum K0 value. The minimum K0 value is used to indicate a time interval between the PDCCH and the PDSCH scheduled by the PDCCH.

According to a third aspect, this application provides a computer-readable storage medium, where the computer-readable storage medium includes computer instructions. When the computer instruction are run on a terminal device (such as a mobile phone), the terminal device is enabled to perform the method according to any one of the first aspect and the possible design manners of the first aspect.

According to a fourth aspect, this application provides a computer program product. When the computer program product runs on a computer, the computer is enabled to execute the method according to any one of the first aspect and the possible design manners of the first aspect.

According to a fifth aspect, an embodiment of this application provides a processing apparatus, including a processor, where the processor is coupled with a memory. The memory stores program instructions, and when the program instructions stored in the memory are executed by the processor, the apparatus implements the method according to any one of the first aspect and the possible design manners of the first aspect. The apparatus may be a terminal device, or may be a component part of the terminal device, such as a chip.

According to a sixth aspect, an embodiment of this application provides a processing apparatus, where the apparatus may be divided into different logical units or modules according to functions, and the units or modules perform different functions, so that the apparatus performs the method according to any one of the first aspect and the possible design manners of the first aspect.

According to a seventh aspect, an embodiment of this application provides a communications system, including a terminal device and a network device, where the terminal device and the network device separately perform some steps to cooperate with each other to implement the method according to any one of the first aspect and the possible design manners of the first aspect.

According to an eighth aspect, an embodiment of this application provides a chip system. The chip system includes an application processor (application processor, AP) used to execute an operating system, a user interface, and an application, and a baseband processor (baseband processor, BP) used to control radio frequency communication. The AP is configured to: determine whether a preset condition is met, and determine a minimum slot offset value in response to the preset condition being met. The BP is configured to: if the minimum slot offset value determined by the terminal device is different from a minimum slot offset value indicated by a cell on which the terminal device currently camps, send assistance information. The assistance information includes the minimum slot offset value determined by the terminal device, and the minimum slot offset value is used for cross-slot scheduling. The related parameter of the terminal device includes at least one of a parameter indicating whether a screen of the terminal device is on or off, a parameter indicating whether the terminal device is being charged, a working mode of the terminal device, remaining battery power of the terminal device, a power loss speed of the terminal device, a network parameter that affects power consumption of the terminal device, and a temperature of the terminal device.

According to a ninth aspect, an embodiment of this application provides a chip system, where the chip system includes one or more interface circuits and one or more processors. The interface circuit is interconnected with the processor through a line.

The foregoing chip system may be applied to a terminal device that includes a communications module and a memory. The interface circuit is configured to receive a signal from the memory of the electronic device, and send the signal to the processor, where the signal includes computer instructions stored in the memory. When the processor executes the computer instructions, the electronic device executes the method according to any one of the first aspect and the possible design manners of the first aspect.

It may be understood that, for beneficial effects achieved in the foregoing provided chip system according to the second aspect, the computer-readable storage medium according to the third aspect, the computer program product according to the fourth aspect, the apparatus according to the fifth aspect, the apparatus according to the sixth aspect, the system according to the seventh aspect, the chip system according to the eighth aspect, and the chip system according to the ninth aspect, reference may be made to the beneficial effect in the first aspect and any possible design manner thereof, and details are not described herein again.

BRIEF DESCRIPTION OF THE DRAWINGS

FIG. 1 is a schematic diagram of a slot according to an embodiment of this application;

DETAILED DESCRIPTION OF ILLUSTRATIVE EMBODIMENTS

Figure 2A:
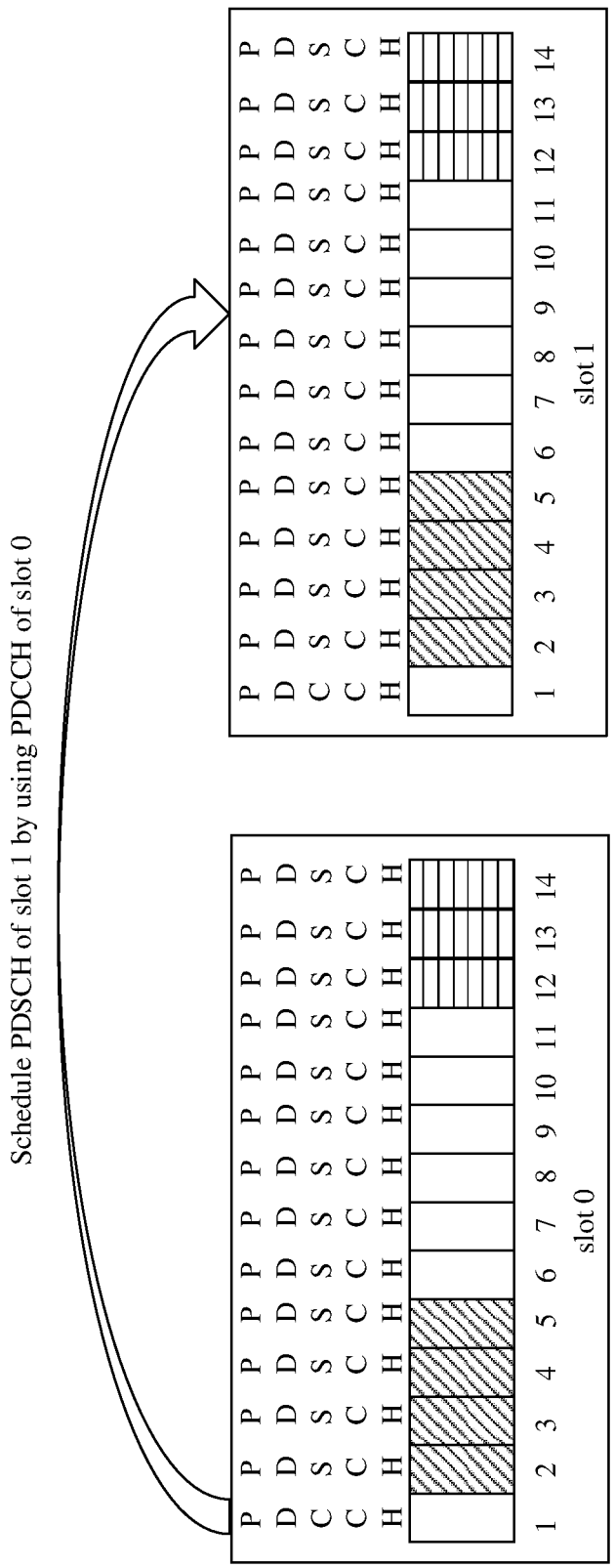
FIG. 2A is a schematic diagram of cross-slot scheduling according to an embodiment of this application.

For clarity and brevity of the following embodiments, related concepts or technologies are first briefly described.

MicroSleep (MicroSleep) technology: Power consumption of LTE and NR is relatively high, which is mainly reflected in two aspects: baseband and radio frequency. To reduce power consumption, the industry proposes a Micro-Sleep technology that supports symbol (symbol) level/microsecond level disabling of a downlink receive path, thereby saving power consumption. Specifically, in a slot, after a PDCCH is received and DCI is demodulated by user equipment (user equipment, UE), if it is determined that there is no PDSCH scheduling (that is, there is no PDSCH to be sent to the UE after the PDCCH), some downlink receive channels may be shut down, to save power consumption. Currently, each chip platform can support the MicroSleep technology.

For example, as shown in FIG. 1, a subcarrier spacing (subcarrier spacing, SCS)=30 KHz is used as an example, and a length of one slot is 0.5 ms, including 14 symbols (symbol) in total. It is assumed that the first symbol is a symbol corresponding to a PDCCH, and the second to fourteenth symbols are symbols corresponding to a PDSCH. Generally, in an active period, the UE needs to monitor a PDCCH in each slot, and the PDCCH includes downlink control information (downlink control information, DCI). The DCI is used to indicate whether the UE has PDSCH scheduling.

As shown in FIG. 1, in the first Symbol, the UE may receive a PDCCH. In the second to fifth Symbols, the UE may perform DCI demodulation locally, and simultaneously receive the PDSCH channel. It is assumed that the DCI demodulation process spends a total of four symbols (different chip platforms may take different time). After the DCI is demodulated, it is recognized that the PDCCH is not scheduled, that is, PDSCH channel information in the second to fourteenth symbols is useless to the UE. In this case, the UE may discard the PDSCH channel received in the second to fifth symbols, and may disable the downlink receive channel. Because the UE needs to continue to monitor the PDCCH at a next slot, the UE evaluates a time required for enabling the downlink receive antenna of the UE. Assuming that the UE needs about three symbols (that is, the twelfth to fourteenth symbols), the UE may disable the downlink receive channel at the sixth to eleventh symbols to enter the Microsleep state.

It can be learned that the PDSCH received by the UE in the second to fifth Symbols is finally discarded, resulting in a waste of power consumption.

K0 value and minimum K0 value: The K0 value is defined in the 3rd generation partnership project (3rd generation partnership project, 3GPP) protocol (refer to NR 38.331 or LTE 36.331), as shown in Table 1.

TABLE 1

| PDSCH-TimeDomainResourceAllocation field descriptions (PDSCH-time domain resource allocation field descriptions) k0 PDSCH-TimeDomainResourceAllocation field descriptions (PDSCH-time domain resource allocation field descriptions) Slot offset between DCI and its scheduled PDSCH (see TS 38.214 [19], clause 5.1.2.1) When the field is absent the UE applies the value 0. (that is, K0 is a slot offset between DCI and its indicated PDSCH (see TS 38.214 [19], clause 5.1.2.1). When the field is absent, the UE considers K0 = 0) |
| --- |

That is, a time interval between the DCI and the corresponding PDSCH may be represented by using a K0 value (in the unit of a slot).

For example, when K0=1, a PDSCH of a next slot of the current slot may be scheduled by using a PDCCH of the current slot. For example, as shown in FIG. 2A, when K0=1, PDSCH of slot 1 may be scheduled by using a PDCCH of slot 0. The PDSCH of slot 2 is scheduled by using the PDCCH of slot 1. The PDSCH of slot n+1 is scheduled by using the PDCCH of slot n.

If all K0 values in the value set of the K0 value of the UE are greater than 0, the UE must be scheduled across slots. If the value set of the K0 value of the UE includes 0, the UE may be scheduled in a same slot, or may be scheduled in a cross-slot manner.

In the power saving research project in the release-16 (release-16, Rel-16) standard protocol, a cross-slot scheduling feature of the release-15 (release-15, Rel-15) standard protocol is improved, and the following functions are supported:

(1) Support DCI dynamic adjustment of a minimum K0 value.

(2) Support the UE to report and modify a minimum K0 value.

It should be understood that the Rel-16 standard protocol and the Rel-15 standard protocol are used as examples for description in this application, and a specific version of the standard protocol is actually not limited in this application. For example, the solutions provided in this application may also be applied to the Rel-17 standard protocol, the Rel-18 standard protocol, the Rel-19 standard protocol, and the Rel-20 standard protocol. This is not limited in this application.

In addition, the base station may further indicate a minimum K0 value to the UE, so as to limit an indication range of the K0 value indicated by the base station to the UE. The minimum K0 value may be selected from a value set of the K0 value. For example, the value set of the K0 value configured by the base station for the UE by using RRC signaling is {0, 1, 2, 3}, that is, in one scheduling, the base station may indicate to the UE that the K0 value is any one of {0, 1, 2, 3}. After that, the base station indicates that the minimum K0 value is 1 to the UE. Then, the base station may indicate that the K0 value is any one of {1, 2, 3} to the UE, and cannot indicate that the K0 value is 0 to the UE. In this manner, the UE may know in advance that all K0 values indicated by the UE are greater than 0, and the UE is definitely scheduled in a cross-slot manner. In this case, the UE can avoid buffering some useless data, so that energy saving can be achieved.

Figure 2B:
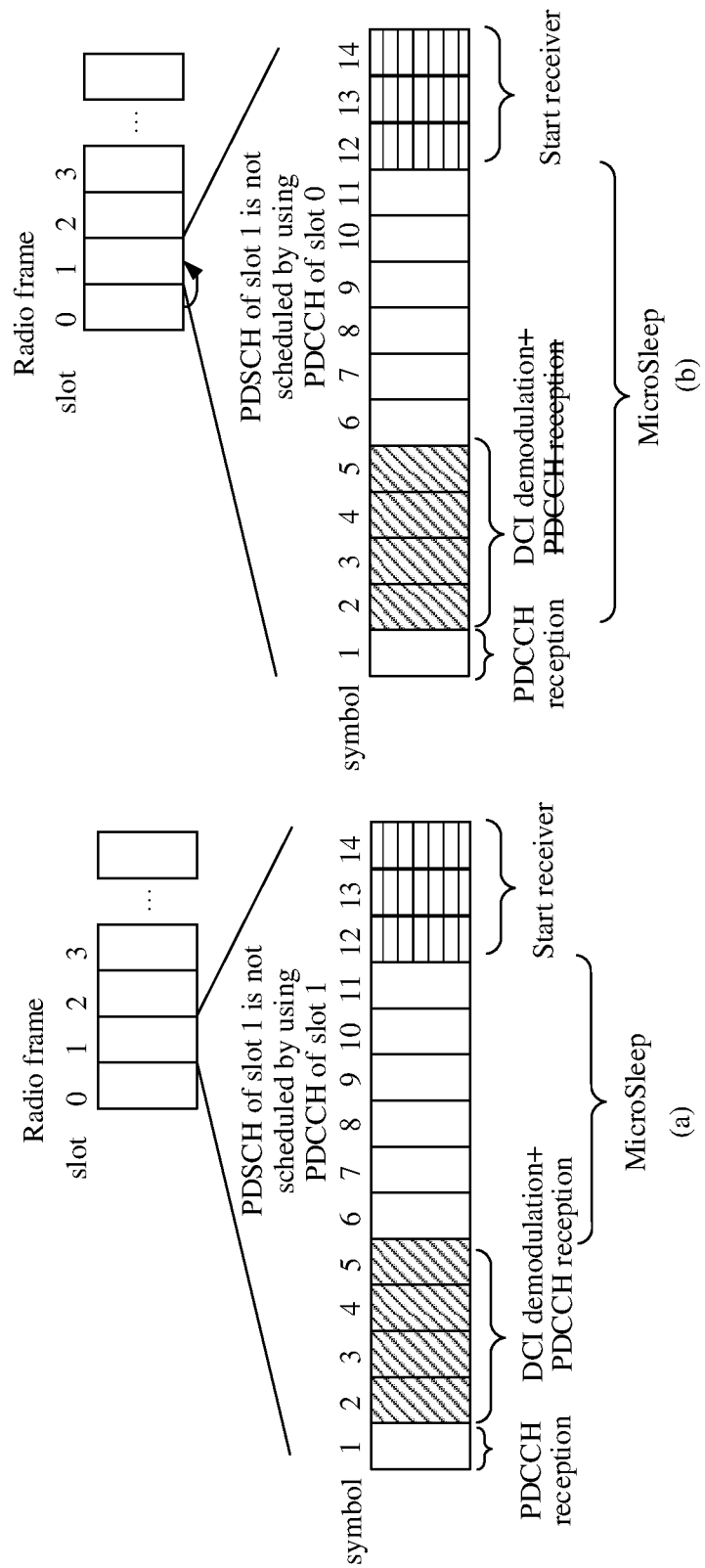
FIG. 2B is a schematic diagram of same-slot scheduling and cross-slot scheduling according to an embodiment of this application.

During scheduling in a same slot, in each slot, only after DCI demodulation is performed and it is determined that the PDCCH does not schedule the PDSCH, the downlink receive channel is disabled to enter the MicroSleep state. For example, as shown in (a) in FIG. 2B, after the PDCCH is received on the first symbol of the slot 1, the UE may locally perform DCI demodulation on the second to the fifth symbol. If it is determined that the PDCCH of the slot 1 is not scheduled for the PDSCH of the slot 1, the UE may disable the downlink receive channel at the sixth to eleventh symbols to enter the Microsleep state. The UE may open a downlink receive channel at the eleventh to fourteenth symbols, so as to receive a PDCCH of a next slot.

During cross-slot scheduling, the UE may predict, in the slot n, whether there is PDSCH scheduling in slot n+k0. If no, immediately after the PDCCH is received in the slot n+K0, the downlink receive channel is closed, or the chip may reduce the DCI demodulation voltage according to a capability of the chip, thereby saving more power consumption. For example, assuming that n=0, k0=1, as shown in (b) in FIG. 2B, the UE may predict that the slot 1 does not have PDSCH scheduling, and immediately after the PDCCH is received in the first symbol of the slot 1, the downlink receive channel is closed, that is, the UE may disable the downlink receive channel at the second to eleventh symbols to enter the Microsleep state. The UE may open a downlink receive channel at the eleventh to fourteenth symbols, so as to receive a PDCCH of a next slot.

It should be noted that the foregoing is an example of configuration. Because of different network configurations, times (related to search space) required for DCI demodulation by different chips may be different. For example, when the SCS is 30 KHz, four symbols are required for DCI demodulation, that is, 0.5 ms/14*4=143 us. When the SCS is 120 KHz, the K0=1 is not enough, and a larger K0 value, such as K0=4, may be required to enable the UE to enter more MicroSleep, thereby obtaining a power gain.

In conclusion, the power saving benefits of Microsleep are not the best due to the following reasons. In a same-slot scheduling scenario, to avoid missing data, when DCI demodulation is performed, a PDSCH needs to be received. After the DCI is successfully demodulated, if the DCI indicates that the PDSCH is not scheduled, the PDSCH received during the DCI demodulation period is discarded, resulting in a waste of power consumption. In addition, in a same-slot scheduling scenario, in a millimeter wave scenario in which the SCS is 60 Hz/120 KHz, because DCI occupies a relatively long time, the chip may not be able to enter MicroSleep. In addition, in most current service scenarios, PDCCH only slot accounts for more than 80% of all slots. In the same-slot scheduling scenario, if a current slot is PDCCH only slot, that is, there is no PDSCH scheduling, the UE still enabling a downlink receive antenna during DCI demodulation is actually a waste of power.

This application provides a method for determining a minimum slot offset value. The terminal device may determine a minimum slot offset value according to at least one of an application type, a related parameter of the terminal device, data packet sparsity, or a network environment parameter, and determine, based on the minimum slot offset value, whether to perform same-slot scheduling or cross-slot scheduling, so that a balance can be obtained between saving power consumption and reducing a delay. In a case in which the delay has a minimum effect on user experience, a lower power consumption is obtained.

The technical solutions in the embodiments of this application may be applied to various communications systems that can support cross-slot scheduling, for example, a long term evolution (long term evolution, LTE) system, an LTE frequency division duplex (frequency division duplex, FDD) system, an LTE time division duplex (time division duplex, TDD) system, a worldwide interoperability for microwave access (worldwide interoperability for microwave access, WiMAX) communications system, and a 5G mobile communications system or new radio (new radio, NR). The 5G mobile communications system described in this application includes a non-standalone (non-standalone, NSA) 5G mobile communications system and/or a standalone (standalone, SA) 5G mobile communications system. The technical solutions provided in this application may further be applied to future communications systems, such as a sixth-generation mobile communications system. The communications system may also be a public land mobile network (public land mobile network, PLMN), a device-to-device (device-to-device, D2D) network, a machine to machine (machine to machine, M2M) network, an internet of things (internet of things, IoT) network, or another network.

Figure 3:
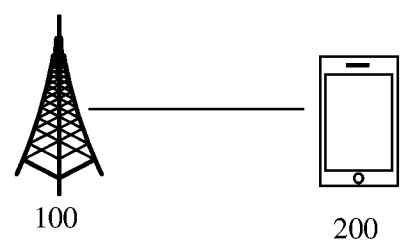
FIG. 3 is a schematic diagram of a system architecture according to an embodiment of this application.

FIG. 3 shows a schematic diagram of a communications system applicable to a technical solution according to an embodiment of this application. The communications system may include a network side device 100 and one or more terminal side devices 200 (only one is shown in FIG. 3) connected to the network side device 100. Data may be transmitted between the network side device (also referred to as a network device) and the terminal side device (also referred to as a terminal device).

The network side device 100 may be a device that can communicate with the terminal side device 200. For example, the network side device 100 may be a base station, and the base station may be an evolved NodeB (evolved NodeB, eNB or eNodeB) in LTE, or may be a base station in NR, a relay station or an access point, or a base station in a future network. This is not limited in this embodiment of this application. The base station in NR may also be referred to as a transmission reception point (transmission reception point, TRP) or a gNB. In this embodiment of this application, the network side device may be an independently sold network device, such as a base station, or may be a chip that implements a corresponding function in the network device. In this embodiment of this application, the chip system may include a chip, or may include a chip and another discrete component. In the technical solution provided in this embodiment of this application, an example in which an apparatus for implementing a function of a network side device is a network device is used to describe the technical solution provided in this embodiment of this application.

The terminal side device 200 in this embodiment of this application may be also referred to as a terminal, and may be a device having a wireless transceiving function. The terminal may be deployed on land, including indoor or outdoor, handheld, or in-vehicle. The terminal may alternatively be deployed on a water surface (such as a ship). The terminal may alternatively be deployed in the air (for example, on aircraft, balloons, or satellites). The terminal side device may be user equipment (user equipment, UE). The UE includes a handheld device, an in-vehicle device, a wearable device, or a computing device that have a wireless communication function. For example, the UE may be a mobile phone (mobile phone), a tablet computer, or a computer with a wireless transceiver function. The terminal side device may further be a virtual reality (virtual reality, VR) terminal side device, an augmented reality (augmented reality, AR) terminal side device, a wireless terminal in industrial control, a wireless terminal in driving, a wireless terminal in telemedicine, a wireless terminal in a smart network, a wireless terminal in a smart city (smart city), a wireless terminal in a smart home (smart home), or the like. In this embodiment of this application, the terminal side device may be an independently sold terminal, or may be a chip in the terminal. In the technical solution provided in this embodiment of this application, that an apparatus used to implement a function of a terminal is a terminal side device is used as an example to describe the technical solution provided in this embodiment of this application.

The network side device 100 or the terminal side device 200 in FIG. 3 in this embodiment of this application may be implemented by one device, or may be a function module in one device. This is not specifically limited in this embodiment of this application. It may be understood that the foregoing functions may be a network element in a hardware device, or may be a software function running on dedicated hardware, or may be a virtualized function instantiated on a platform (for example, a cloud platform), or may be a chip system. In this embodiment of this application, the chip system may include a chip, or may include a chip and another discrete component.

Figure 4:
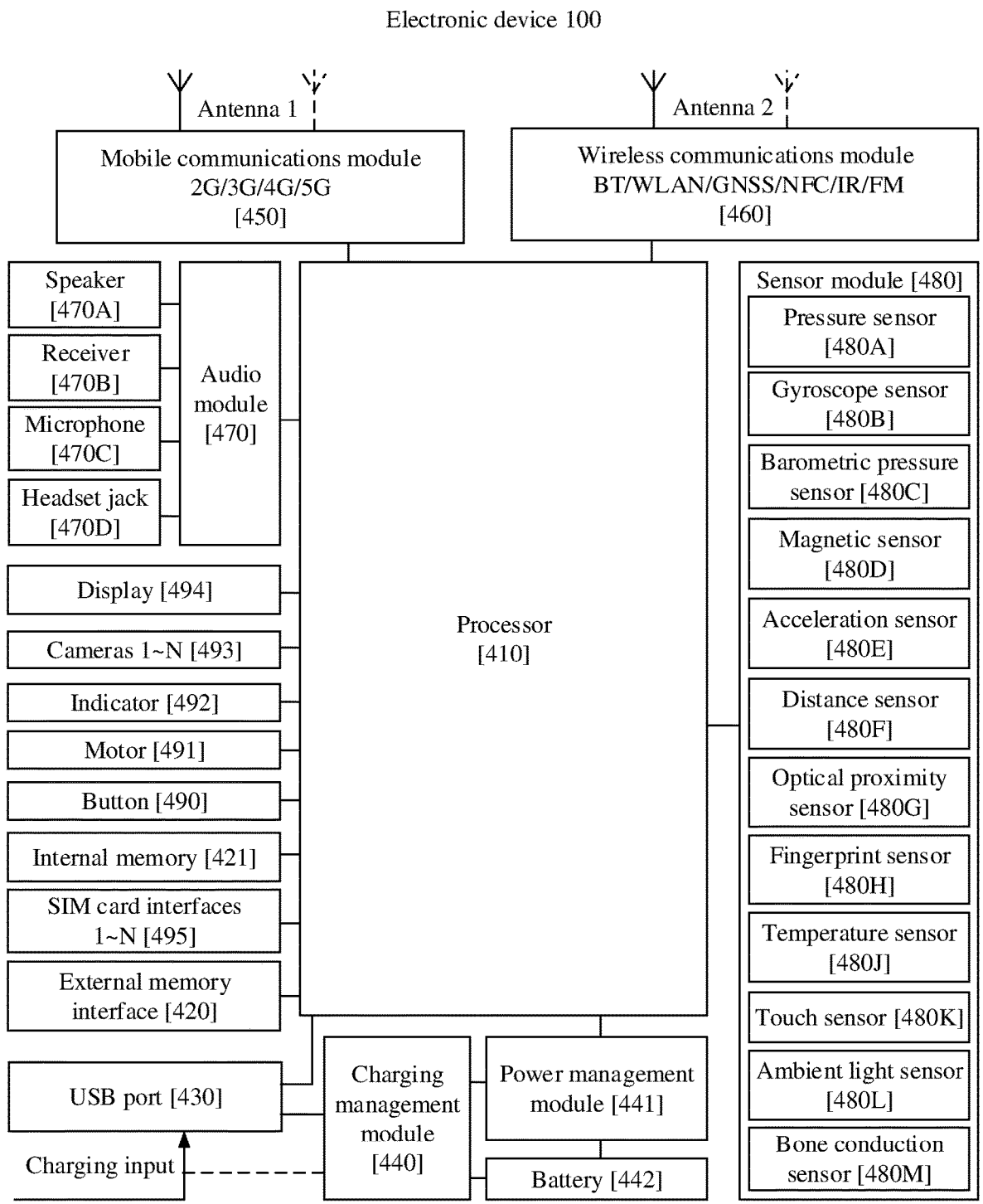
FIG. 4 is a schematic diagram of a structure of a terminal device according to an embodiment of this application.

As shown in FIG. 4, FIG. 4 is a schematic diagram of a structure of an electronic device 100 according to an embodiment of this application. The electronic device 100 may be a terminal device. As shown in FIG. 4, the electronic device 100 may include a processor 410, an external memory interface 420, an internal memory 421, a universal serial bus (universal serial bus, USB) port 430, a charging management module 440, a power management module 441, a battery 442, an antenna 1, an antenna 2, a mobile communications module 450, a wireless communications module 460, an audio module 470, a speaker 470A, a receiver 470B, a microphone 470C, a headset jack 470D, a sensor module 480, a button 490, a motor 491, an indicator 492, a camera 493, a display 494, and a subscriber identification module (subscriber identification module, SIM) card interface 495. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, and a bone conduction sensor 480M.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 100. The controller may generate an operation control signal based on an instruction operation code and a time sequence signal, to control instruction reading and instruction execution.

A memory may be disposed in the processor 410, and is configured to store an instruction and data. In some embodiments, the memory in the processor 410 is a cache memory. The memory may store an instruction or data that has just been used or is cyclically used by the processor 410. If the processor 410 needs to use the instruction or data again, the instruction or data may be directly invoked from the memory. Therefore, repeated access is avoided, a waiting time of the processor 410 is reduced, and system efficiency is improved.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on the structure of the electronic device 100. In some other embodiments, the electronic device 100 may alternatively use an interface connection manner different from that in the foregoing embodiment, or use a combination of a plurality of interface connection manners.

The charging management module 440 is configured to receive a charging input from a charger. The charger may be a wireless charger, or may be a wired charger. In some wired charging embodiments, the charging management module 440 may receive a charging input of a wired charger through the USB port 430. In some wireless charging embodiments, the charging management module 440 may receive a wireless charging input by using a wireless charging coil of the electronic device 100. While charging the battery 442, the charging management module 440 may further supply power to the electronic device by using the power management module 441.

The power management module 441 is configured to connect to the battery 442, the charging management module 440, and the processor 410. The power management module 441 receives input of the battery 442 and/or the charging management module 440, and supplies power to the processor 410, the internal memory 421, an external memory, the display 494, the camera 493, the wireless communications module 460, and the like. The power management module 441 may be further configured to monitor parameters such as a battery capacity, a quantity of battery cycles, and a battery health state (leakage or impedance). In some other embodiments, the power management module 441 may alternatively be disposed in the processor 410. In some other embodiments, the power management module 441 and the charging management module 440 may alternatively be disposed in a same component.

A wireless communication function of the electronic device 100 may be implemented through the antenna 1, the antenna 2, the mobile communications module 450, the wireless communications module 460, the modem processor, the baseband processor, and the like.

The antenna 1 and the antenna 2 are configured to transmit and receive electromagnetic wave signals. Each antenna in the electronic device 100 may be configured to cover a single or a plurality of communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The mobile communications module 450 may provide a wireless communication solution, including 2G/3G/4G/5G or the like, that is applied to the electronic device 100. The mobile communications module 450 may include at least one filter, a switch, a power amplifier, a low noise amplifier (low noise amplifier, LNA), and the like. The mobile communications module 450 may receive an electromagnetic wave through the antenna 1, perform processing such as filtering and amplification on the received electromagnetic wave, and transmit a processed electromagnetic wave to the modem processor for demodulation. The mobile communications module 450 may further amplify a signal obtained after modulation by the modem processor, and convert the signal into an electromagnetic wave through the antenna 1 for radiation. In some embodiments, at least a part of the functional modules of the mobile communications module 450 may be disposed in the processor 410. In some embodiments, at least a part of the functional modules of the mobile communications module 450 may be disposed in the same device as at least a part of the modules of the processor 410.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 470A, the receiver 470B, or the like), or displays an image or a video on the display 494. In some embodiments, the modem processor may be an independent device. In other embodiments, the modem processor may be independent of the processor 410 and disposed in the same device as the mobile communications module 450 or other functional modules.

The wireless communications module 460 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 460 may be one or more components into which at least one communications processing module is integrated. The wireless communications module 460 receives an electromagnetic wave over the antenna 2, performs frequency modulation and filtering processing on an electromagnetic wave signal, and sends a processed signal to the processor 410. The wireless communications module 460 may further receive a to-be-sent signal from the processor 410, perform frequency modulation and amplification on the signal, and convert the signal into an electromagnetic wave for radiation over the antenna 2.

In some embodiments, the antenna 1 of the electronic device 100 is coupled to the mobile communications module 450, and the antenna 2 is coupled to the wireless communications module 460, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 494, the application processor, and the like. The GPU is a microprocessor for image processing, and connects the display 494 and the application processor. The GPU is configured to perform mathematical and geometrical calculation, and is configured to perform graphics rendering. The processor 410 may include one or more GPUs that execute program instructions to generate or change display information.

The display 494 is configured to display an image, a video, and the like.

The display 494 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like.

The electronic device 100 may implement a photographing function by using the ISP, the camera 493, the video codec, the GPU, the display 494, the application processor, and the like.

The ISP is configured to process data fed back by the camera 493. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 493.

The camera 493 is configured to capture a still image or a video. An optical image of an object is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 493, where N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts MPEG) 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 100, for example, image recognition, facial recognition, voice recognition, and text understanding.

The external memory interface 420 may be configured to connect to an external memory card, for example, a micro SD card, to extend a storage capability of the electronic device 100. The external storage card communicates with the processor 410 by using the external memory interface 420, so as to implement a data storage function, for example, store files such as music and a video into the external storage card. In this embodiment of this application, an external storage card (for example, a Micro SD card) may be configured to store all pictures in a system album. The Micro SD card is generally open to a user, and the user may freely delete and access pictures in the system album.

The internal memory 421 may be configured to store computer-executable program code, where the computer-executable program code includes instructions. The processor 410 executes various functional applications of the electronic device 100 and data processing by running instructions stored in the internal memory 421. For example, in this embodiment of this application, the processor 410 may display corresponding display content on the display screen 494 in response to a second operation or a first operation of the user on the display screen 494 by executing an instruction stored in the internal memory 421. The internal storage 421 may include a program storage area and a data storage area. The program storage area may store an operating system, an application (for example, a sound playback function or an image playback function) required by at least one function, and the like. The data storage area may store data (for example, audio data and an address book) and the like created when the electronic device 100 is being used. In addition, the internal memory 421 may include a high-speed random access memory, or may include a non-volatile memory such as at least one magnetic disk memory, a flash memory, a universal flash storage (universal flash storage, UFS), and a read-only memory (read-only memory, ROM). In this embodiment of this application, the path and the identification information (including the identification information of the picture or the identification information of the picture set) of the picture in the target album interface may be stored in an internal memory. By reading the path of the picture, the picture may be obtained from the external memory and loaded into the internal memory, and the picture or the picture set may be displayed according to a corresponding rule or manner based on the identification information.

The electronic device 100 may implement audio functions by using the audio module 470, the speaker 470A, the receiver 470B, the microphone 270C, the headset jack 170D, the application processor, and the like. The audio functions are, for example, music playback and recording.

The audio module 470 is configured to convert digital audio information into an analog audio signal for output, and is also configured to convert an analog audio input into a digital audio signal. The audio module 470 may be further configured to encode and decode an audio signal. In some embodiments, the audio module 470 may be disposed in the processor 410, or some functional modules of the audio module 470 may be disposed in the processor 410. The speaker 470A, also referred to as a "loudspeaker", is configured to convert an audio electrical signal into a sound signal. The electronic device 100 may be used to listen to music or listen to a hands-free call through the speaker 470A. The receiver 470B, also referred to as an "earpiece", is configured to convert an audio electrical signal into a sound signal. When the electronic device 100 answers a call or voice message, the receiver 470B may be placed near the human ear to answer the voice. The microphone 470C, also referred to as a "mike" or a "mic", is configured to convert a sound signal into an electrical signal. The electronic device 100 may be provided with at least one microphone 470C. In other embodiments, the electronic device 100 may be provided with two microphones 470C, and in addition to collecting a sound signal, a noise reduction function may be implemented. In some other embodiments, the electronic device 100 may be provided with three, four, or more microphones 470C, so as to collect a sound signal, reduce noise, identify a sound source, implement a directional recording function, and the like.

The headset jack 470D is configured to connect to a wired headset. The headset jack 470D may be the USB port 430, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 480A is configured to sense a pressure signal, and may convert the pressure signal into an electrical signal. In some embodiments, the pressure sensor 480A may be disposed on the display 494. There are many types of pressure sensors 480A, such as a resistive pressure sensor, an inductive pressure sensor, and a capacitive pressure sensor. The capacitive pressure sensor may include at least two parallel plates made of conductive materials. When force is exerted on the pressure sensor 480A, capacitance between electrodes changes. The electronic device 100 determines strength of the pressure based on the change of the capacitance. When a touch operation is performed on the display 494, the electronic device 100 detects strength of the touch operation by using the pressure sensor 480A. The electronic device 100 may calculate a touch position based on a detected signal of the pressure sensor 480A. In some embodiments, touch operations that are performed at a same touch location but have different touch operation strength may correspond to different operation instructions. For example, when a touch operation whose touch operation strength is less than a first pressure threshold acts on the Messages application icon, an instruction for viewing an SMS message is executed. When a touch operation whose touch operation strength is greater than or equal to the first pressure threshold is performed on the Messages application icon, an instruction for creating a new SMS message is executed.

The gyroscope sensor 480B may be configured to determine a motion posture of the electronic device 100. In some embodiments, the angular velocity of the electronic device 100 around three axes (that is, x, y, and z axes) may be determined by using the gyroscope sensor 480B. The gyroscope sensor 480B may be configured to implement image stabilization during image shooting. For example, when a shutter is pressed, the gyroscope sensor 480B detects a jittering angle of the electronic device 400, calculates, based on the angle, a distance for which a lens module needs to compensate, and enables the lens to offset jittering of the electronic device 400 through reverse motion, so as to implement image stabilization. The gyroscope sensor 480B may be further used in a navigation scenario and a motion-controlled gaming scenario. In this embodiment of this application, the display 494 of the electronic device 100 may be folded to form multiple screens. Each screen may include a gyroscope sensor 480B configured to measure the orientation (that is, orientation vector) of the corresponding screen. The electronic device 100 may determine an included angle between adjacent screens according to an angle change of an orientation of each screen obtained by means of measurement.

The barometric pressure sensor 480C is configured to measure barometric pressure. In some embodiments, the electronic device 100 calculates an altitude based on a barometric pressure value measured by the barometric pressure sensor 480C, to assist in positioning and navigation.

The magnetic sensor 480D includes a Hall sensor. The electronic device 100 may detect opening and closing of a flip cover by using the magnetic sensor 480D. In some embodiments, when the electronic device 100 is a flip phone, the electronic device 100 may detect opening and closing of a flip cover according to the magnetic sensor 480D. Further, a feature such as automatic unlocking upon opening of the flip cover is set according to the detected opening/closing state of the flip cover.

The acceleration sensor 480E may detect the acceleration of the electronic device 100 in all directions (generally three axes). When the electronic device 100 is still, a gravity size and a direction may be detected. The electronic device may be further configured to identify an electronic device posture, and is applied to applications such as horizontal and vertical screen switching and a pacemaker. It should be noted that in this embodiment of this application, the display 494 of the electronic device 100 may be folded to form multiple screens. Each screen may include an acceleration sensor 480E configured to measure the orientation (that is, orientation vector) of the corresponding screen.

The distance sensor 480F is configured to measure a distance. The electronic device 100 may measure a distance by using infrared or laser. In some embodiments, in a photographing scene, the electronic device 100 may use the distance sensor 480F to measure a distance to implement fast focusing.

The proximity light sensor 480G may include, for example, a light emitting diode (LED) and a photodetector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the proximity light sensor 480G, that the user handles the electronic device 100 close to the ear, so as to automatically turn off the screen to save power. The proximity light sensor 480G may also be used in automatically unlocking and locking in a smart cover mode and a pocket mode.

The ambient light sensor 480L is configured to sense ambient light brightness. The electronic device 100 may adaptively adjust the brightness of the display 494 according to the perceived ambient brightness. The ambient light sensor 480L may also be configured to automatically adjust a white balance during photographing. The ambient light sensor 480L may further cooperate with the proximity light sensor 480G to detect whether the electronic device 100 is in the pocket to prevent a false touch.

The fingerprint sensor 480H is configured to collect a fingerprint. The electronic device 100 may implement fingerprint unlocking, access application lock, fingerprint photographing, and fingerprint receiving by using the collected fingerprint feature.

The temperature sensor 480J is configured to detect a temperature. In some embodiments, the electronic device 100 executes a temperature processing policy by using the temperature detected by the temperature sensor 480J. For example, when the temperature reported by the temperature sensor 480J exceeds the threshold, the electronic device 100 performs performance reduction of the processor located near the temperature sensor 480J, so as to reduce power consumption and implement thermal protection. In other embodiments, when the temperature is below another threshold, the electronic device 100 heats the battery 442 to avoid abnormal shutdown of the electronic device 100 due to low temperature. In other embodiments, when the temperature is below another threshold, the electronic device 100 boosts the output voltage of the battery 442 to avoid abnormal shutdown due to low temperature.

The touch sensor 480K is also referred to as a "touch panel". The touch sensor 480K may be disposed on the display 494. The touch sensor 480K and the display 494 form a touchscreen, which is also referred to as a "touch screen". The touch sensor 480K is configured to detect a touch operation performed on or near the touch sensor 280K. The touch sensor may transfer a detected touch operation to the application processor to determine a touch event type. A visual output related to a touch operation may be provided by using the display 494. In some other embodiments, the touch sensor 480K may alternatively be disposed on a surface of the electronic device 100 at a position different from a position of the display 494.

The bone conduction sensor 480M may obtain a vibration signal. In some embodiments, the bone conduction sensor 480M may obtain a vibration signal of a human acoustic vibration bone block. The bone conduction sensor 480M may also contact a human pulse to receive a blood pressure beat signal. In some embodiments, the bone conduction sensor 480M may also be disposed in the headset to combine with the bone conduction headset. The audio module 470 may parse out a voice signal based on the vibration signal that is of the sound part and that is obtained by the bone conduction sensor 480M, to implement a voice function. The application processor may parse the heart rate information based on the blood pressure jitter signal obtained by the bone conduction sensor 480M, to implement a heart rate detection function.

The button 490 includes a power-on button, a volume button, and the like. The button 490 may be a mechanical button, or may be a touch-sensitive button. The electronic device 100 may receive a button input, and generate a button signal input related to user setting and function control of the electronic device 100.

The motor 491 may generate a vibration prompt. The motor 491 may be used for an incoming call vibration prompt, or may be used for touch vibration feedback. For example, touch operations performed on different applications (for example, photographing and audio playback) may correspond to different vibration feedback effects. The motor 491 may also correspond to different vibration feedback effects when applied to touch operations in different areas of the display 494. Different application scenarios (for example, time reminders, receiving information, an alarm clock, and a game) may also correspond to different vibration feedback effects. The touch vibration feedback effect may further support customization.

The indicator 492 may be an indicator light, and may be used to indicate a charging status or a power change, or may be used to indicate a message, a missed call, a notification, or the like.

The SIM card interface 495 is configured to connect to a SIM card. The SIM card may be inserted into the SIM card interface 495 or pulled out of the SIM card interface 495, so that the SIM card is in contact with or separated from the electronic device 100. The electronic device 100 may support one or N SIM card interfaces, where N is a positive integer greater than 1. The SIM card interface 495 may support a Nano SIM card, a Micro SIM card, a SIM card, and the like. A same SIM card interface 495 may be connected to multiple cards at the same time. Types of the multiple cards may be the same or different. The SIM card interface 495 may be compatible with different types of SIM cards. The SIM card interface 495 may also be compatible with an external storage card. The electronic device 100 interacts with a network by using a SIM card, so as to implement functions such as a call and data communication. In some embodiments, the electronic device 100 uses an eSIM, that is, an embedded SIM card. The eSIM card may be embedded in the electronic device 100, and cannot be separated from the electronic device 100.

The method in the following embodiment may be implemented by the electronic device 100 having the foregoing hardware structure.

It may be understood that the structure shown in this embodiment does not constitute a specific limitation on the electronic device 100. In other embodiments, the electronic device 100 may include more or fewer components than those shown in the figure, or some components may be combined, or some components may be split, or components are arranged in different manners. The illustrated components may be implemented by hardware, software, or a combination of software and hardware. For example, the electronic device 100 may further include an assistance device such as a mouse, a keyboard, and a drawing board, and is configured to: Make, transfer, receive, and customize a target expression.

The foregoing electronic device 100 may be a general device or a dedicated device. In specific implementation, the electronic device 100 may be a desktop computer, a portable computer, a network server, a personal digital assistant (personal digital assistant, PDA), a mobile phone, a tablet computer, a wireless terminal side device, an embedded device, or a device having a similar structure in FIG. 4. A type of the electronic device 100 is not limited in this embodiment of this application.

Figure 5:
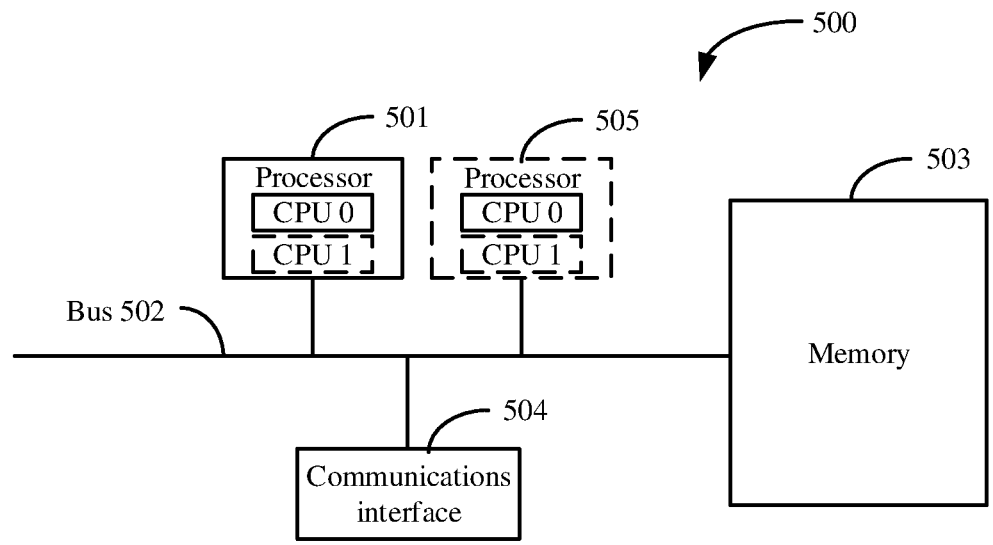
FIG. 5 is a schematic diagram of a structure of a network device according to an embodiment of this application.

For example, the apparatus for implementing the function of the network side device provided in this embodiment of this application may be implemented by using the apparatus 500 in FIG. 5. FIG. 5 is a schematic structural diagram of hardware of an apparatus 500 according to an embodiment of this application. The apparatus 500 includes at least one processor 501, configured to implement a function of a network side device provided in an embodiment of this application. The apparatus 500 may further include a bus 502 and at least one communications interface 504. The apparatus 500 may further include a memory 503.

The bus 502 may be configured to transfer information between the foregoing components.

The communications interface 504 is configured to communicate with another device or a communications network, such as an Ethernet, a RAN, and a WLAN. The communications interface 504 may be an interface, a circuit, a transceiver, or another apparatus that can implement communication, which is not limited in this application. The communications interface 504 may be coupled to the processor 501.

The memory 503 is configured to store a program instruction, and may be controlled and executed by the processor 501, so as to implement the method provided in the following embodiments of this application. For example, the processor 501 is configured to invoke and execute the instruction stored in the memory 503, so as to implement the method provided in the following embodiments of this application.

Optionally, the memory 503 may be included in the processor 501.

In specific implementation, in an embodiment, the processor 501 may include one or more CPUs, for example, CPU 0 and CPU 1 in FIG. 5.

In specific implementation, in an embodiment, the apparatus 500 may include multiple processors, such as the processor 501 and the processor 505 in FIG. 5. Each of these processors may be a single-core processor, or may be a multi-core processor. The processor herein may refer to one or more devices, circuits, and/or processing cores configured to process data (for example, a computer program instruction).

The following describes technical solutions in embodiments of this application with reference to accompanying drawings in the embodiments of this application. In the description of this application, unless otherwise stated, "at least one" refers to one or more, and "multiple" refers to two or more. In addition, for ease of clearly describing the technical solutions in the embodiments of this application, in the embodiments of this application, words such as "first" and "second" are used to distinguish same items or similar items whose functions and effects are basically the same. A person skilled in the art may understand that words such as "first" and "second" do not limit a quantity and an execution order, and words such as "first" and "second" do not limit a certain difference.

For ease of understanding, the following specifically describes, with reference to the accompanying drawings, the method for determining a minimum slot offset value provided in the embodiments of this application.

Figure 6:
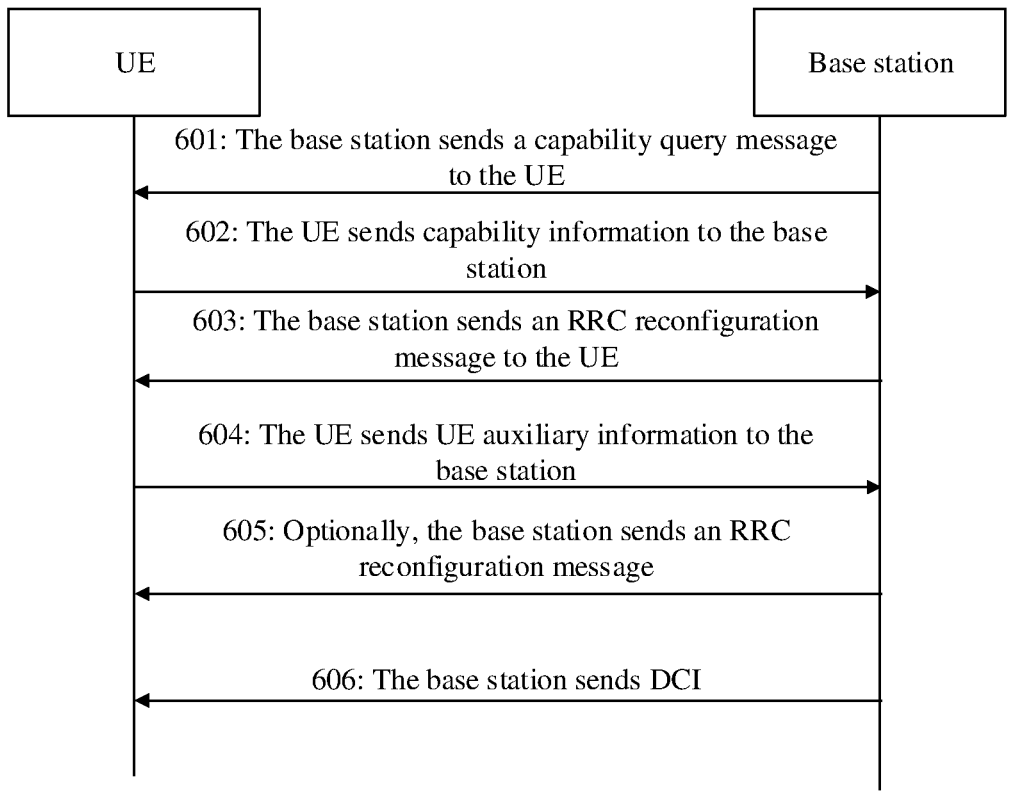
FIG. 6 is a schematic flowchart according to an embodiment of this application.

As shown in FIG. 6, an embodiment of this application provides a method for determining a minimum slot offset value. An example in which a network device is a base station and an electronic device is a UE is used for description, including:

601: A base station sends a capability query message to UE, where the capability query message is used to query a capability of the UE.

The capability query message may be, for example, a UE Capability Enquiry Message.

602: The UE sends capability information to the base station.

After receiving the capability query message sent by the base station, the UE may send the capability information to the base station.

The capability information may be, for example, UE Capability Information. The UE Capability Information may include a Phy-ParametersCommon information element (information element). The Phy-ParametersCommon information element is as follows:

```
Phy-ParametersCommon ::=      SEQUENCE {
  ...
    crossSlotScheduling-r16         SEQUENCE {
      licensedBand-r16              ENUMERATED {supported}   OPTIONAL,
      unlicensedBand-r16               ENUMERATED {supported}   OPTIONAL
    }                               OPTIONAL,
  ...
}
Phy-ParametersFRX-Diff ::=    SEQUENCE {
  ...
    dl-SchedulingOffset-PDSCH-TypeA     ENUMERATED {supported}
OPTIONAL,
    dl-SchedulingOffset-PDSCH-TypeB     ENUMERATED {supported}
OPTIONAL,
}
```

The crossSlotScheduling-r16 field indicates whether the cross-slot scheduling enhancement function in the Rib is supported: The dl-SchedulingOffset-PDSCH-TypeA field and the dl-SchedulingOffset-PDSCH-TypeB field indicate cross-slot scheduling in the R15.

603: The base station sends an RRC reconfiguration message to the UE.

After receiving the capability information sent by the UE, the base station may send an RRC reconfiguration message to the UE, where the RRC reconfiguration message is used to notify the UE of the capability on the base station side.

The RRC reconfiguration message may be, for example, a RRC Reconfiguration Message. The RRC Reconfiguration Message may include a PDSCH-Config information element. The PDSCH-Config information element may include two parts. The first part is a PDSCH-TimeDomainResourceAllocationList information element and the second part is a minimumSchedulingOffsetK0 information element.

The PDSCH-Config information element is as follows:

```
PDSCH-Config ::=             SEQUENCE {
  ...
    pdsch-TimeDomainAllocationList      SetupRelease { PDSCH-
TimeDomainResourceAllocationList }     OPTIONAL, -- Need M
  ...
}
```

PDSCH-TimeDomainResourceAllocationList information element is as follows:

```
PDSCH-TimeDomainResourceAllocationList information element
-- ASN1START
-- TAG-PDSCH-TIMEDOMAINRESOURCEALLOCATIONLIST-START
PDSCH-TimeDomainResourceAllocationList ::= SEQUENCE (SIZE(1..maxNrofDL-
Allocations)) OF PDSCH-TimeDomainResourceAllocation
    PDSCH-TimeDomainResourceAllocation ::= SEQUENCE {
        k0                      INTEGER(0..32)   OPTIONAL, -- Need S
        mappingType             ENUMERATED {typeA, typeB},
        startSymbolAndLength    INTEGER (0..127)
    }
```

The PDSCH-TimeDomainResourceAllocationList information element is used to indicate an index of a time domain resource assignment (time domain resource assignment, TDRA) corresponding to the PDSCH in the TDRA table. In the TDRA table, multiple TDRAs are configured on the base station side, including a K0 list (a value set of K0 values) supported by the base station. Different TDRAs correspond to different K0 lists.

The minimumSchedulingOffsetK0 information element is as follows:

```
PDSCH-Config ::=    SEQUENCE {
    ...
    minimumSchedulingOffsetK0-r16    SetupRelease { MinSchedulingOffsetK0-
Values-r16 }        OPTIONAL, -- Need M
    ...
    MinSchedulingOffsetK0-Values-r16 ::= SEQUENCE (SIZE
(1..maxNrOfMinSchedulingOffsetValues-r16)) OF INTEGER (0..maxK0-SchedulingOffset-r16)
    maxNrOfMinSchedulingOffsetValues-r16  INTEGER ::= 2  -- Maximum number
of min. scheduling offset (K0/K2) configurations
    maxK0-SchedulingOffset-r16       INTEGER ::= 16  -- Maximum number of
slots configured as min. scheduling offset (K0)
    ...
}
```

The minimumSchedulingOffsetK0 information element is used to indicate List of minimum K0 values. Minimum K0 parameter denotes minimum applicable value(s) for the TDRA table for PDSCH and for A-CSI RS triggering Offset(s) (see TS 38.214 [19], clause 5.3.1). That is, the minimumSchedulingOffsetK0 information element is used to indicate a list of minimum K0 values. The minimum K0 value represents the minimum applicable value of the TDRA table of the PDSCH and the A-CSI RS trigger offset (see TS 38.214[19], clause 5.3.1).

If the base station supports the UE to modify the minimum K0 value, the base station carries the MinSchedulingOffsetPreferenceConfig-r16 information element in the otherConfig field in the RRC Reconfiguration Message to enable or pause the UE to modify the minimum K0 value, and sets a disabling timer after the K0 value is modified (the timer is used to prevent the UE from frequently reporting the K0 value. Before the timer expires, the UE is not allowed to report the K0 value again).

The MinSchedulingOffsetPreferenceConfig-r16 cell is as follows:

```
MinSchedulingOffsetPreferenceConfig-r16 ::=   SEQUENCE {
    minSchedulingOffsetPreferenceProhibitTimer-r16 ENUMERATED {
        s0, s0dot5, s1, s2, s3, s4, s5, s6, s7,
        s8, s9, s10, s20, s30, spare2, spare1}
}
```

It should be noted that the base station may configure two minimum K0 values for the UE in each SCS. Generally, the two minimum K0 values include 0 (that is, a minimum K0=0). The base station may specifically select one of the two minimum K0 values by using a DCI indication. Alternatively, the base station may configure a minimum K0 value, and indicate, by using DCI, whether to use the value. A value of a minimum K0 value reported by the UE by using assistance information is greater than 0. The UE can control the minimum K0 value on the base station side by reporting a non-0 value (the minimum K0>0 is required) and canceling reporting a non-0 value (that is, not reporting a non-0 value, the minimum K0=0 by default).

604: The UE sends UE assistance information to the base station.

After receiving the RRC reconfiguration message, the UE may send UE assistance information to the base station, where the UE assistance information includes a minimum K0 value expected by the UE.

For example, the UE assistance information may include a minschedulingffsetpreference information element, and the minschedulingffsetpreference information element may include a preferredK0 field. The preferredK0 field may indicate a minimum K0 value expected by the UE.

Herein, preferredK0 Indicates the UE's preferred value of k0 (slot offset between DCI and its scheduled PDSCH—see TS 38.214 [19], clause 5.1.2.1) for cross-slot scheduling for power saving. Value is defined for each subcarrier spacing (numerology) in units of slots. sl1 corresponds to 1 slot, sl2 corresponds to 2 slots, sl4 corresponds to 4 slots, and so on. If a value for a subcarrier spacing is absent, it is interpreted as the UE having no preference on k0 for cross-slot scheduling for that subcarrier spacing. If the field is absent from the MinSchedulingOffsetPreference IE, it is interpreted as the UE having no preference on k0 for cross-slot scheduling. That is, the preferredK0 field indicates a minimum k0 value preferred by the UE (for a slot offset between DCI and a scheduled PDSCH, refer to TS 38.214[19], clause 5.1.2.1), and is used for cross-slot scheduling to save power. The minimum k0 value is defined for each subcarrier spacing in a unit of slot. Sl1 corresponds to one slot, sl2 corresponds to two slots, sl4 corresponds to four slots, and so on. If there is no value of the subcarrier spacing, it is explained that the UE does not preferentially select k0 for cross-slot scheduling of the subcarrier spacing. If there is no preferredK0 field in the minschedulingffsetpreference IE, it is interpreted as a recommended value or an expected value that is not scheduled across slots by the terminal device on the k0.

The Minschedulingffsetpreference information element is as follows:

```
MinSchedulingOffsetPreference-r16 ::= SEQUENCE {
    preferredK0-r16        SEQUENCE {
        preferredK0-SCS-15kHz-r16      ENUMERATED {sl1, sl2, sl4, sl6}    OPTIONAL,
        preferredK0-SCS-30kHz-r16      ENUMERATED {sl1, sl2, sl4, sl6}    OPTIONAL,
        preferredK0-SCS-6okHz-r16      ENUMERATED {sl2, sl4, sl8, sl12}   OPTIONAL,
        preferredK0-SCS-120kHz-r16     ENUMERATED {sl2, sl4, sl8, sl12}   OPTIONAL
    }                                                                      OPTIONAL,
    preferredK2-r16        SEQUENCE {
        preferredK2-SCS-15kHz-r16      ENUMERATED {sl1, sl2, sl4, sl6}    OPTIONAL,
        preferredK2-SCS-30kHz-r16      ENUMERATED {sl1, sl2, sl4, sl6}    OPTIONAL,
        preferredK2-SCS-60kHz-r16      ENUMERATED {sl2, sl4, sl8, sl12}   OPTIONAL,
        preferredK2-SCS-120KHz-r16     ENUMERATED {sl2, sl4, sl8, sl12}   OPTIONAL
    }                                                                      OPTIONAL
}
```

Determining, by the terminal device, a minimum slot offset value according to at least one of an application type corresponding to the first application, a related parameter of the terminal device, data packet sparsity, or a network environment parameter.

In some embodiments, a minimum K0 value expected by the UE may be determined according to an application (application, APP) sensitivity to a delay. The minimum K0 value expected by the UE may be a minimum K0 value that meets a delay requirement of an application running in a foreground of the terminal device.

Figure 8B:
Figure 9A:
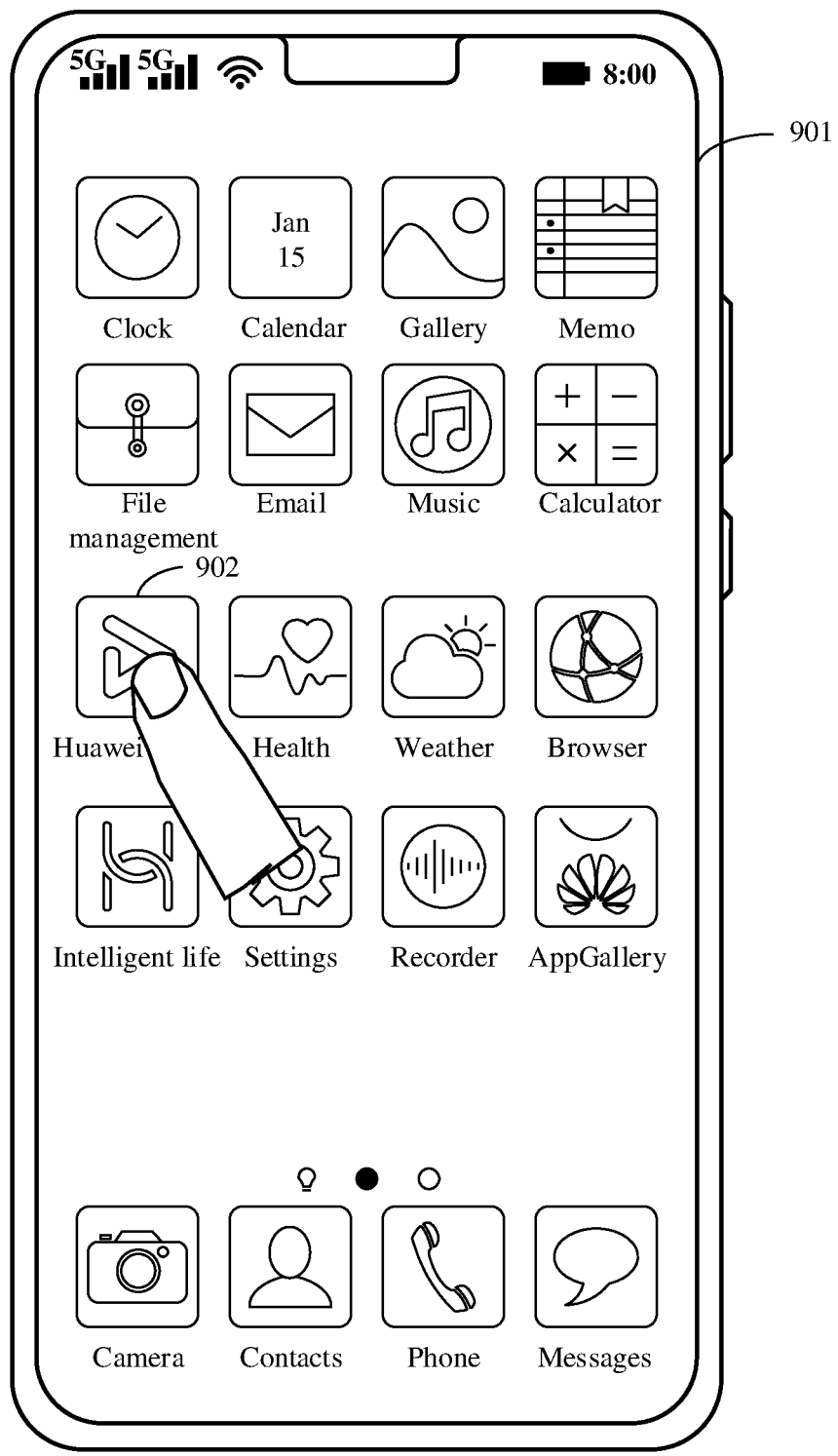
FIG. 9A and FIG. 9B are another schematic diagram of display according to an embodiment of this application.
Figure 9B:
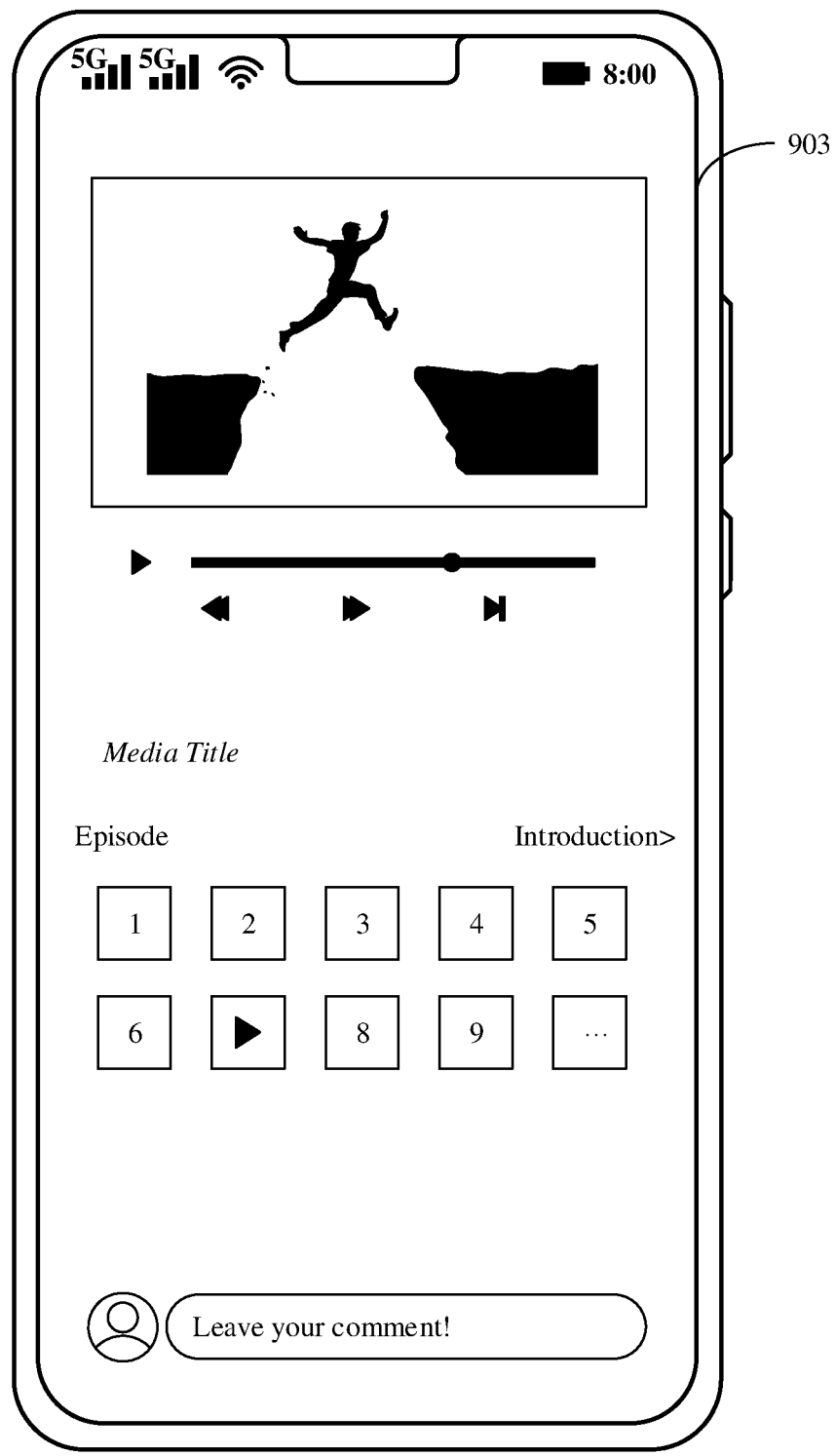

It should be understood that, when the terminal device is displaying a related interface of an application, the application may be a foreground application. For example, as shown in FIG. 8B, the mobile phone may display the call interface 803. In this case, the foreground APP is the telephone APP. As shown in FIG. 9B, the mobile phone may display the video interface 903. In this case, the foreground APP is a video APP. In this case, the foreground APP is a video APP. In addition, the terminal device may have multiple (for example, two) foreground applications when displaying in a split screen.

The foreground running means that the foreground task is running in the CPU. A manner of determining the application running in the foreground may include: Determining whether the application is a foreground program by using functions such as RunningProcess, ActivityLifecycleCallbacks, and UsageStatsManager. Alternatively, if the terminal device is an Android system, whether the application is a foreground program may be determined by using a barrier-free function included in the Android system. Alternatively, if the terminal device is a Linux system, the process information stored in the/proc directory in the Linux system kernel may be read to determine whether the application is a foreground program. For a specific determining process, reference may be made to the prior art, and details are not described herein.

The whitelist may be determined according to a degree of sensitivity of different applications to delays and a minimum K0 value expected by the UE in different applications with different delays. Search for the minimum K0 value corresponding to the application running on the foreground based on the white list. Table 2 is an example of a whitelist (also referred to as a configuration file).

TABLE 2

| Level | Description | Application | Minimum K0 value expected by the UE |
|---|---|---|---|
| Level 0 | Ultra-low delay | Arena Of Valor ®, PUBG ®, Phone, or the like | 0 |
| Level 1 | Ordinary low delay | Web browsing, novel reading, video, or the like | Non-0 value: 120 KHz SCS (4) 60 KHz SCS (2) 30/15 KHz SCS (1) |

As shown in Table 2, a level corresponding to an application may include a level 0 and a level 1. An application corresponding to level 0 requires an ultra-low delay, which is sensitive to the delay. An application corresponding to level 1 requires a common low delay, and is relatively insensitive to the delay. When the UE runs the application corresponding to the level 0, a minimum K0 value expected by the UE may be 0. When the UE runs the application corresponding to the level 1, a minimum K0 value expected by the UE may be non-0. Specifically, in different SCSs, the minimum K0 value expected by the UE may be different. For example, at a 120 KHz SCS, a minimum K0 value expected by the UE may be 4; at a 60 KHz SCS, a minimum K0 value expected by the UE may be 2; at a 30 KHz SCS, the minimum K0 value expected by the UE may be 1.

It should be noted that a minimum K0 value expected by different UEs may be determined according to different SCS. Alternatively, a minimum K0 value expected by different UEs may be determined according to different BWPs. For example, when the BWP is less than a threshold A, the minimum K0 value expected by the UE is greater than 0; or when the BWP is greater than a threshold B, the minimum K0 value expected by the UE is equal to 0. Alternatively, the minimum K0 value expected by different UEs may be determined according to different BWPs and SCSs. For example, when the SCS is 120 KHz and the BWP is less than threshold A, the minimum K0 value expected by the UE may be 4.

Figure 7:
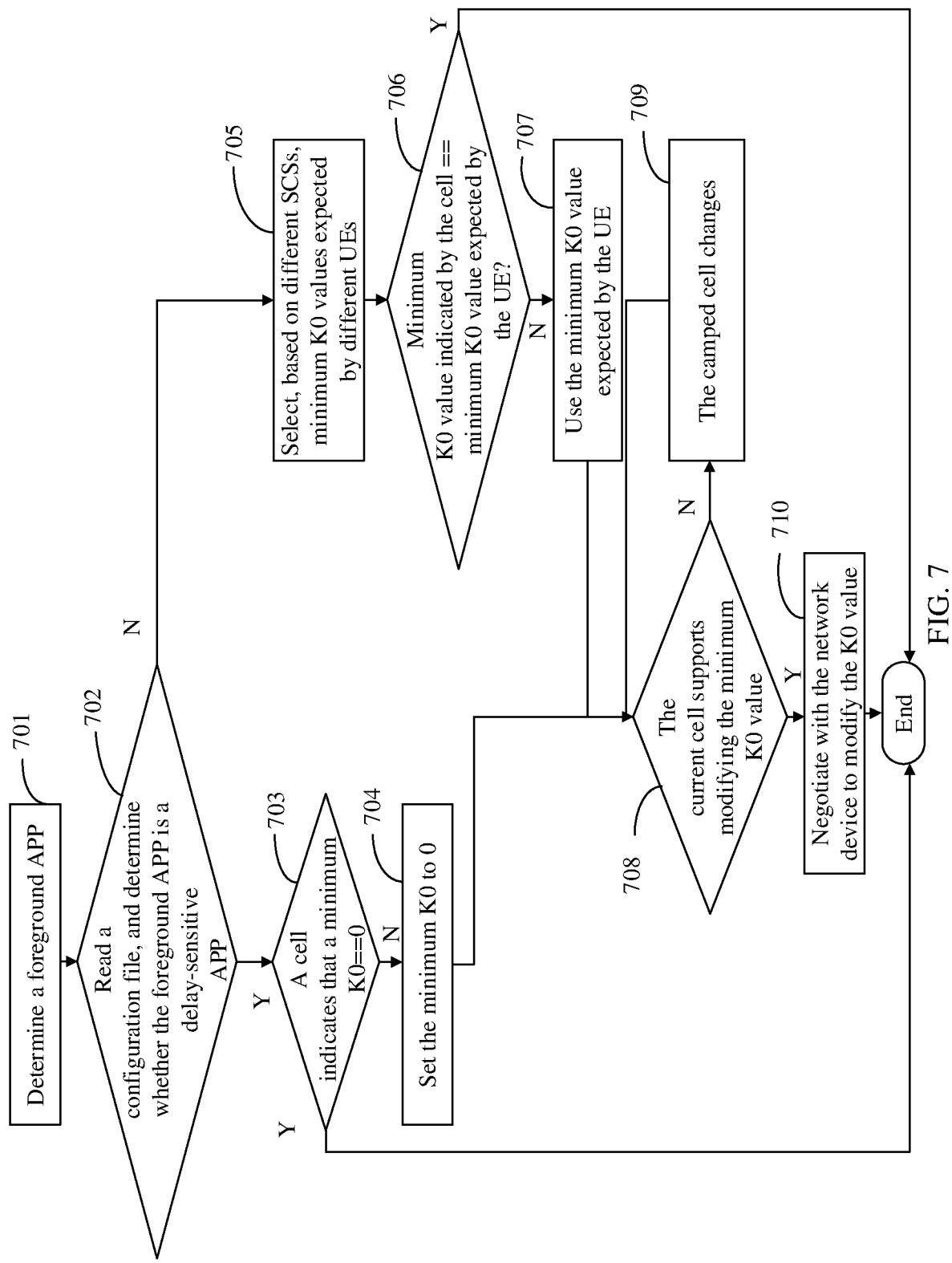
FIG. 7 is another schematic flowchart according to an embodiment of this application.

As shown in FIG. 7, a process of determining, according to the application sensitivity to a delay, a minimum K0 value expected by the UE may include the following steps:

701: UE determines a foreground APP.

Figure 8A:
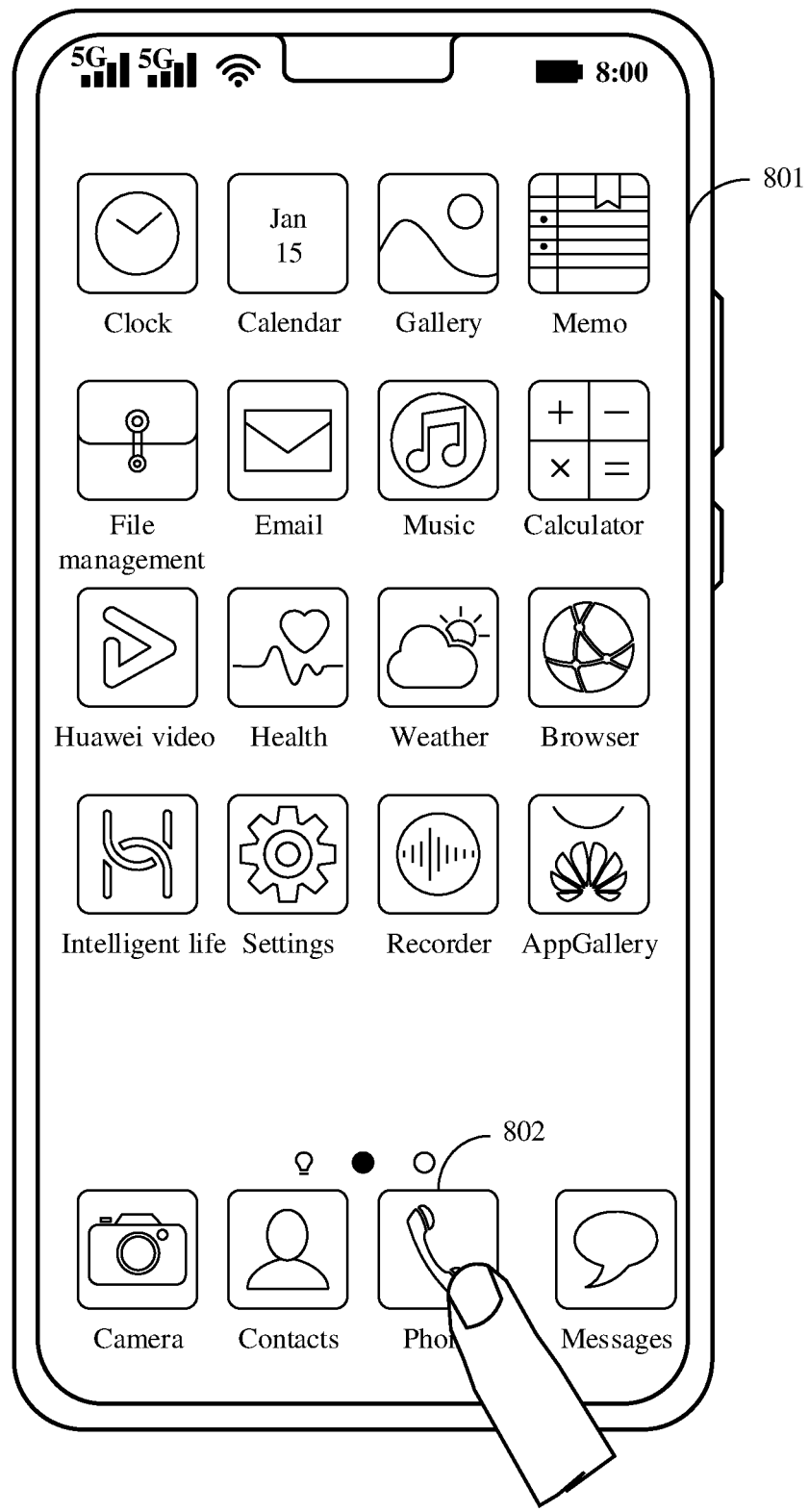
FIG. 8A and FIG. 8B are a schematic diagram of display according to an embodiment of this application.

For example, as shown in FIG. 8A, in response to the user tapping an icon 802 corresponding to the phone APP on the home screen interface 801, the UE (for example, the mobile phone) may open the phone APP. As shown in FIG. 8B, the mobile phone may display the call interface 803. In this case, the foreground APP is the telephone APP. For another example, as shown in FIG. 9A, in response to an operation performed by the user by tapping the icon 902 corresponding to the video APP on the home screen interface 901, the UE (for example, the mobile phone) may open the video APP. As shown in FIG. 9B, the mobile phone may display the video interface 903. In this case, the foreground APP is a video APP. In this case, the foreground APP is a video APP.

702: Read a configuration file, and determine whether the foreground APP is a delay-sensitive APP.

For example, when the foreground APP is a telephone APP, a configuration file is read to determine that an ultra-low delay is required by the telephone APP, that is, the telephone APP is a delay-sensitive APP. In this case, a minimum K0 value expected by the UE is 0, that is, the UE expects to be scheduled in a same slot to reduce a delay.

703: A cell indicates that the minimum K0==0.

"==" represents an equivalent character. When parameters on both sides of the equivalent character are of a same type, it is directly compared whether they are the same. Type conversion may be performed on different types, and comparison is performed after conversion into a same type.

If the minimum K0 value indicated by the cell on which the current UE camps is 0, because the minimum K0 value indicated by the cell is the same as the minimum K0 value expected by the UE, in this case, the minimum K0 value does not need to be modified, and the procedure ends.

704: Set the minimum K0 to 0.

If the minimum K0 value indicated by the cell on which the UE currently camps is not 0, because the minimum K0 value indicated by the cell is different from the minimum K0 value expected by the UE, in this case, the minimum K0 value needs to be modified, that is, the minimum K0 value is set to 0.

705: Select, based on different SCSs, minimum K0 values expected by different UEs.

If the foreground APP is a non-delay sensitive application, the minimum K0 value expected by different UEs can be selected based on different SCS. For example, at a 120 KHz SCS, a minimum K0 value expected by the UE may be 4; at a 60 KHz SCS, a minimum K0 value expected by the UE may be 2; at a 30 KHz SCS, the minimum K0 value expected by the UE may be 1.

706: Determine whether the minimum K0 value indicated by the cell is the same as the minimum K0 value expected by the UE.

If the minimum K0 value indicated by the cell on which the UE currently camps is the same as the minimum K0 value determined by the UE, the minimum K0 value does not need to be modified, and the procedure ends.

707: Use the minimum K0 value expected by the UE.

If the minimum K0 value indicated by the cell on which the UE currently camps is different from the minimum K0 value indicated by the UE, the minimum K0 value expected by the UE is set as the minimum K0 value expected by the UE.

708: The current cell supports modifying the minimum K0 value.

If the current cell supports dynamic modification of the K0, report the minimum K0 value expected by the UE to the network device.

709: The camped cell changes.

If the camped cell changes, it is determined whether the changed cell supports modification of the minimum K0 value. If dynamic modification of the K0 is supported, the minimum K0 value expected by the UE is reported to the network device. The negotiation mechanism follows the protocol process. Details are not described herein.

710: Negotiate with the network device to modify the K0 value.

The UE may negotiate with the network device to modify the minimum K0 value, which is based on the minimum K0 value expected by the UE, that is, set the minimum K0 value to the minimum K0 value expected by the UE.

It should be noted that a sequence of steps in FIG. 7 may be adjusted. For example, step 708 may be placed before step 702, and a change of the sequence of steps does not affect implementation of the solution.

It should be noted that the table shown in Table 2 may be preset in the UE, or may be set in a cloud service (cloud), and is sent to the UE by using the cloud. However, because there are a large number of APPs of a user, an increasing number of APPs may not be met in a manner of setting a whitelist no matter whether it is preset or set in the cloud. In this case, a delay of different applications in different K0 values may be dynamically learned, and a table shown in Table 2 is dynamically generated, so as to determine a minimum K0 value expected by the UE. That is, in other embodiments, the minimum K0 value expected by the UE may be indirectly determined based on the application's sensitivity to delay by dynamically learning the delay of different applications at different K0 values.

Figure 10A:
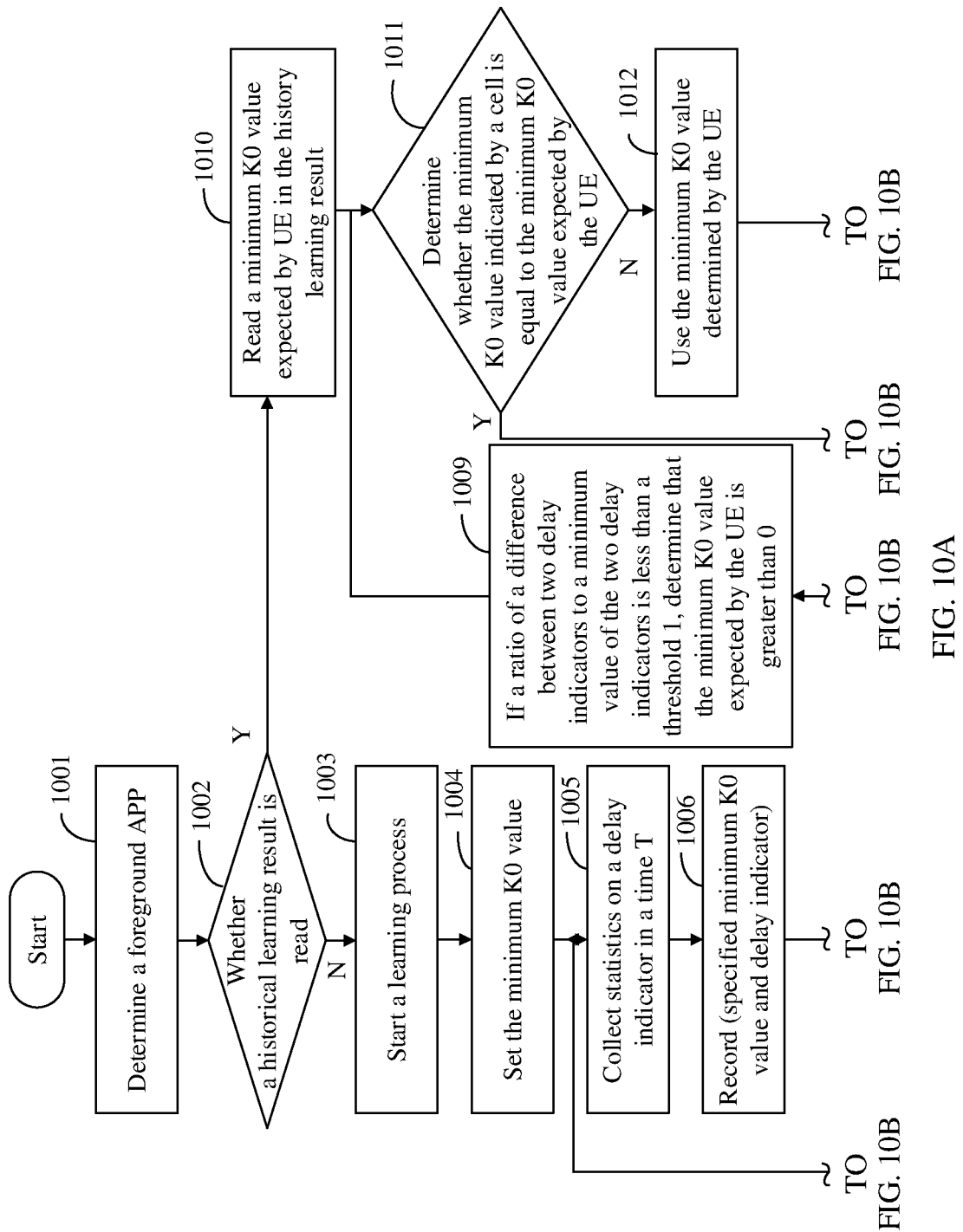
FIG. 10A and FIG. 10B are another schematic flowchart according to an embodiment of this application.
Figure 10B:
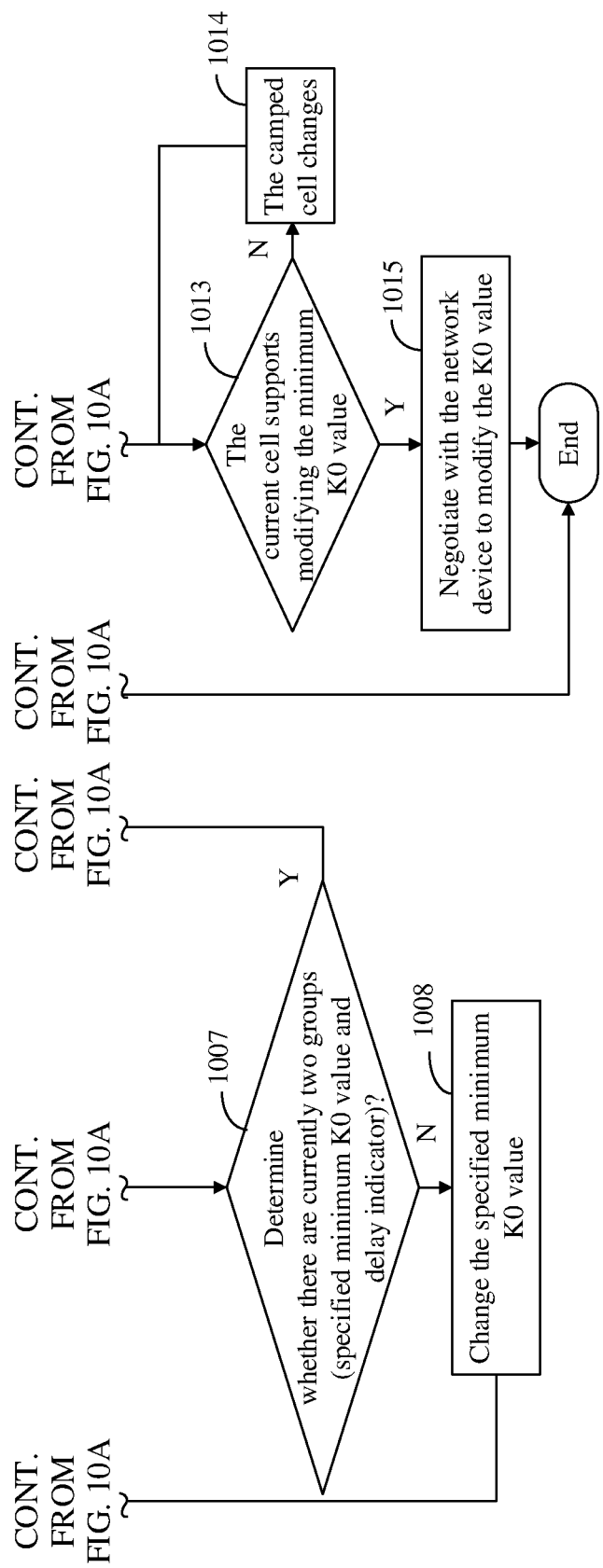

As shown in FIG. RA and FIG. 10B, a process of dynamically learning delay of different applications at different K0 values, and indirectly determining a minimum K0 value expected by the UE may include the following steps:

1001: Determine a foreground APP.

For related descriptions, refer to step 701. Details are not described herein again.

1002: Determine whether a history learning result is read.

Determine whether the foreground APP has a history learning result. If a delay of the foreground APP in different K0 values has been learned, the history learning result can be read. If the delay of the foreground APP in different K0 values is not learned, the history learning result cannot be read.

1003: Start a learning process.

If the delay of the foreground APP in different K0 values is not learned, the process of learning the delay of the foreground APP in different K0 values can be started.

1004: Set a minimum K0 value.

The UE may set a minimum K0 value, for example, may select a value from the set of K0 values configured by the network device.

1005: Collect statistics on a delay indicator in a time T.

The UE collects statistics on the delay indicator of the foreground application in time T. The delay indicator may be, for example, a round trip time (round trip time, RTT) delay.

1006: Record (specified minimum K0 value and delay indicator).

That is, the UE records a set minimum K0 value and a delay indicator of the foreground application in the time T.

1007: Determine whether there are currently two groups (specified minimum K0 value and delay indicator).

It should be noted that the UE may set different minimum K0 values one by one to record a delay indicator (for example, an average RTT delay indicator) in the time T. It should be understood that when a minimum K0 value is set to a non-0 value, a value may be selected based on a current SCS.

The UE determines whether a minimum K0 value is set twice (the minimum K0 value set twice may be different) and a delay indicator corresponding to the minimum K0 value set twice. If the time is less than two times, step 1008 may be performed.

1008: Change the specified minimum K0 value.

That is, the UE may reset a minimum K0 value, which may be different from the minimum K0 value specified in step 1004. The minimum K0 values specified in step 1004 and step 1008 may be respectively corresponding to 0 and a non-0 (value).

1009: If a ratio of a difference between the two delay indicators to a minimum value of the two delay indicators is less than a threshold 1, determine that the minimum K0 value expected by the UE is greater than 0.

For example, it is assumed that a delay indicator corresponding to a minimum K0 value set for the first time is an indicator 1, and a delay indicator corresponding to a minimum K0 value set for the second time is an indicator 2. If |indicator 1—indicator 2|/min{indicator 1, indicator 2}<threshold 1, it indicates that the foreground APP is insensitive to a delay of cross-slot scheduling. To save power consumption, the expected K0 value (that is, the minimum K0 value expected by the UE) of the APP may be set to a non-0 value; or otherwise, the expected K0 value is set to 0. It should be understood that when a minimum K0 value is set to a non-0 value, a value may be selected based on a current SCS.

1010: Read a minimum K0 value expected by the UE in a history learning result.

Determine whether the foreground APP has a history learning result. If a delay of the foreground APP in different K0 values has been learned, the history learning result can be read. The history learning result includes the minimum K0 value expected by the UE.

1011: Determine whether the minimum K0 value indicated by the cell is equal to the minimum K0 value expected by the UE.

If the history learning result includes that the minimum K0 value expected by the UE is consistent with the expectation, the procedure ends.

1012: Use the minimum K0 value determined by the UE.

1013: The current cell supports modifying the minimum K0 value.

1014: The camped cell changes.

1015: Negotiate with the network device to modify the minimum K0 value.

For related descriptions of step 1011-1015, refer to step 706-710. Details are not described herein again.

In still another embodiment, the minimum K0 value expected by the UE may be determined based on a related parameter of the terminal device. The related parameter of the terminal device includes at least one of a parameter indicating whether a screen of the terminal device is on or off, a parameter indicating whether the terminal device is being charged, a working mode of the terminal device, remaining battery power of the terminal device, a power loss speed of the terminal device, a network parameter that affects power consumption of the terminal device, and a temperature of the terminal device.

In a possible implementation, the terminal device determines the minimum slot offset value based on the parameter indicating whether the screen of the terminal device is on or off; and if the screen of the terminal device is off, determines that the minimum slot offset value is greater than 0; or if the screen of the terminal device is on, determines that the minimum slot offset value is equal to 0.

In a possible implementation, the terminal device determines the minimum slot offset value based on the parameter indicating whether the terminal device is being charged, and if the terminal device is being charged, determines that the minimum slot offset value is equal to 0.

In a possible implementation, the terminal device determines the minimum slot offset value based on the working mode of the terminal device; and if the terminal device is in a low-power mode or a low-power-consumption mode, determines that the minimum slot offset value is greater than 0; or if the terminal device is in a performance mode, determines that the minimum slot offset value is equal to 0.

In a possible implementation, the terminal device determines the minimum slot offset value based on the remaining battery power of the terminal device; and if the remaining battery power of the terminal device is less than a second threshold, determines that the minimum slot offset value is greater than 0; or if the remaining battery power of the terminal device is greater than a third threshold, determines that the minimum slot offset value is equal to 0.

In a possible implementation, the terminal device determines the minimum slot offset value based on the power loss speed of the terminal device, and if the power loss speed of the terminal device is greater than a fourth threshold, determines that the minimum slot offset value is greater than 0, or if the power loss speed of the terminal device is less than a fifth threshold, determines that the minimum slot offset value is equal to 0.

In a possible implementation, the terminal device determines the minimum slot offset value based on the network parameter that affects power consumption of the terminal device; and if a first condition is met, determines that the minimum slot offset value is greater than 0, where the first condition includes at least one of the following cases: a current network supports BWP, a current network supports CDRX, and an uplink pre-scheduling ratio is less than a sixth threshold; or if the first condition is not met, determines that the minimum slot offset value is equal to 0.

In a possible implementation, the terminal device determines the minimum slot offset value based on the temperature of the terminal device, and if the temperature of the terminal device is greater than a seventh threshold, determines that the minimum slot offset value is greater than 0.

In a possible implementation, the terminal device determines the minimum slot offset value based on the parameter indicating whether the screen of the terminal device is on or off and the working mode of the terminal device; and if the screen of the terminal device is off and the terminal device is in a low-power mode or a low-power-consumption mode, determines that the minimum slot offset value is greater than 0; or if the screen of the terminal device is on and the terminal device is in a performance mode, determines that the minimum slot offset value is equal to 0.

In a possible implementation, the terminal device determines the minimum slot offset value based on the parameter indicating whether the screen of the terminal device is on or off, the working mode of the terminal device, and the remaining battery power of the terminal device; and if the screen of the terminal device is off, the terminal device is in a low-power mode or a low-power-consumption mode, and the remaining battery power of the terminal device is less than a second threshold, determines that the minimum slot offset value is greater than 0; or if the screen of the terminal device is on, the terminal device is in a performance mode, and the remaining battery power of the terminal device is greater than a third threshold, determines that the minimum slot offset value is equal to 0.

It should be noted that the determining, based on a related parameter of the terminal device, the minimum K0 value expected by the UE may further include another case. This application is not listed one by one.

In still other embodiments, the minimum K0 value expected by the UE may be determined based on the packet sparsity.

For example, as shown in Table 3, definition of packet sparsity at different implementation levels may be different. The policy for determining the minimum K0 value expected by the UE is different under different packet sparsity definitions.

TABLE 3

| | Definition of sparsity | Strategy |
|---|---|---|
| Application layer | Number of uplink and downlink packets per second Number of uplink and downlink bytes per second | Number of uplink and downlink packets per second < threshold 11 && Number of uplink and downlink bytes per second < threshold 12, then K0 > 0 Number of uplink and downlink packets per second > Threshold 21 ‖ Number of uplink and downlink bytes per second > Threshold 22, then set K0 = 0 Otherwise, it remains unchanged. |
| MAC layer | Number of Uplink and Downlink MAC PDU Per 100 ms Number of uplink and downlink MAC Bytes per 100 ms | Number of uplink and downlink MAC PDU per 100 ms < threshold 31 && Number of uplink and downlink MAC Bytes per 100 ms < threshold 32, set K0 > 0 If the number of uplink and downlink MAC PDU per 100 ms > the threshold 41 && the number of uplink and downlink MAC Bytes per 100 ms > the threshold 42, then K0 = 0 Otherwise, it remains unchanged. |
| PHY layer | Number of Downlink Schedules per 100 ms | If the number of downlink schedules per 100 ms is less than threshold 5, set K0 > 0. If the number of downlink schedules per 100 ms is greater than the threshold 6, set K0 = 0. Otherwise, it remains unchanged. |

"&&" represents a logical sum, and "‖" represents a logical sum.

In a possible design, a minimum K0 value expected by the UE may also be determined based on definitions of multiple (two or more) packet sparsity.

For example, for the application layer, the number of uplink and downlink packets per second is less than the threshold 11 && the number of uplink and downlink bytes per second is less than the threshold 12. In addition, for a MAC layer, when a quantity of uplink and downlink MAC PDU per 100 ms is less than a threshold 31 && a quantity of uplink and downlink MAC Bytes per 100 ms is less than a threshold 32, it is determined that a minimum K0 value expected by the UE is greater than 0.

It should be noted that the determining, based on the packet sparsity, the minimum K0 value expected by the UE may further include another case. This application is not listed one by one.

In still other embodiments, the minimum K0 value expected by the UE may be determined based on factors such as a network environment or a channel environment, to ensure that the service experience is guaranteed in the event of poor wireless network quality.

The network environment or the channel environment may be indicated by one or more of RSRP, an SINR, and RSRQ.

Exemplarily, when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, and a variation amplitude of the RSRQ is greater than a twenty-third threshold, it is determined that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, and a variation amplitude of the RSRQ is less than a twenty-ninth threshold, it is determined that the minimum slot offset value is greater than 0.

It should be understood that the terminal device may further determine the minimum slot offset value with reference to two or more of the application type, the related parameter of the terminal device, the data packet sparsity, and the network environment parameter. A specific combination manner is not listed one by one in this application.

605: Optionally, the base station sends an RRC reconfiguration message to notify the UE whether the base station agrees the minimum K0 value uploaded by the UE.

Because the base station generally does not deliver too much signaling, the RRC reconfiguration message is optional.

606: The base station sends DCI, where the DCI includes information used to switch the minimum K0 value.

That is, the base station may configure a minimum K0 value for the UE by means of DCI switching.

Based on the method provided in this embodiment of this application, the terminal device may determine a minimum slot offset value according to at least one of an application type, a related parameter of the terminal device, data packet sparsity, or a network environment parameter, and determine, based on the minimum slot offset value, whether to perform same-slot scheduling or cross-slot scheduling, so that a balance can be obtained between saving power consumption and reducing a delay. In a case in which the delay has a minimum effect on user experience, a lower power consumption is obtained.

Figure 11:
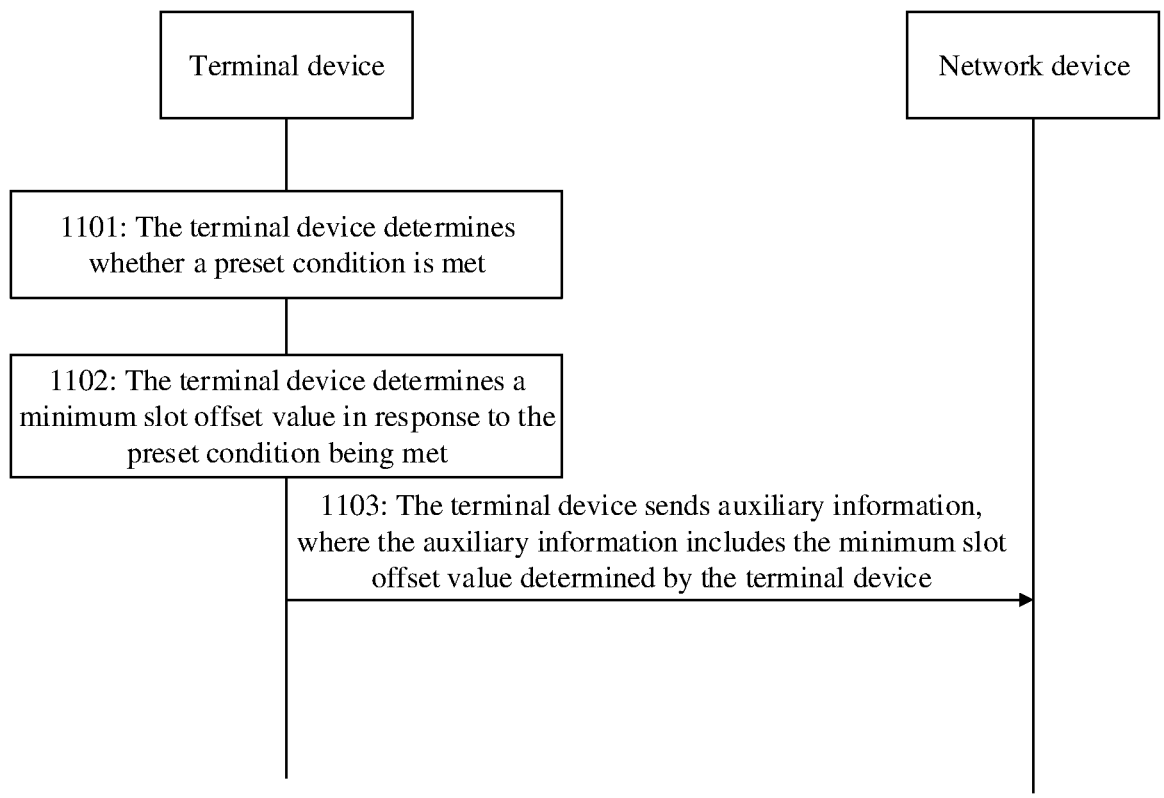
FIG. 11 is another schematic flowchart according to an embodiment of this application.

As shown in FIG. 11, an embodiment of this application provides a method for determining a minimum slot offset value, including the following steps.

1101: A terminal device determines whether a preset condition is met.

The preset condition includes at least one of the following cases: a preset application is opened, a related parameter of the terminal device changes, data packet sparsity changes, or a network environment parameter changes.

The related parameter of the terminal device includes at least one of a parameter indicating whether a screen of the terminal device is on or off, a parameter indicating whether the terminal device is being charged, a working mode of the terminal device, remaining battery power of the terminal device, a power loss speed of the terminal device, a network parameter that affects power consumption of the terminal device, and a temperature of the terminal device.

The data packet sparsity is used to indicate a quantity of uplink and downlink packets and/or uplink and downlink bytes transmitted at an application layer per second; or the data packet sparsity is used to indicate a quantity of uplink and downlink physical address layer user packet data units and/or a quantity of uplink and downlink physical address layer bytes transmitted every 100 milliseconds at a physical address layer; or the data packet sparsity is used to indicate a quantity of downlink scheduling times transmitted at a physical layer every 100 milliseconds.

The network environment parameter includes one or more of reference signal received power RSRP, a signal to interference plus noise ratio SINR, and reference signal received quality RSRQ.

1102: The terminal device determines a minimum slot offset value in response to the preset condition being met.

The terminal device determines that the minimum slot offset value may be the foregoing minimum K0 value expected by the terminal device.

1103: If the minimum slot offset value determined by the terminal device is different from a minimum slot offset value indicated by a cell on which the terminal device currently camps, the terminal device sends assistance information, where the assistance information includes the minimum slot offset value determined by the terminal device, and the minimum slot offset value is used for cross-slot scheduling.

In a possible implementation, if the preset condition includes that the preset application is opened, the determining, by the terminal device, a minimum slot offset value in response to the preset condition being met includes: determining, by the terminal device, the minimum slot offset value based on an application type corresponding to the preset application, where the application type includes a first type and a second type, the first type is corresponding to an application for a first delay requirement, the second type is corresponding to an application for a second delay requirement, and the first delay requirement is higher than the second delay requirement; and when the type of the first application is the first type, determining that the minimum slot offset value is equal to 0; or when the type of the first application is the second type, determining that the minimum slot offset value is greater than 0. For example, an application corresponding to level 0 requires an ultra-low delay, and is sensitive to the delay. An application corresponding to level 1 requires a common low delay, and is relatively insensitive to the delay. When the UE runs the application corresponding to the level 0, a minimum K0 value expected by the UE may be 0. When the UE runs the application corresponding to the level 1, a minimum K0 value expected by the UE may be non-0. In this way, a delay requirement of an application running in the foreground of the terminal device can be met.

In a possible implementation, if the preset condition includes that the preset application is opened, the determining, by the terminal device, a minimum slot offset value in response to the preset condition being met includes: determining whether the preset application has a corresponding historical learning result, where the historical learning result is used to indicate a minimum slot offset value corresponding to a latest running time of the preset application; if the preset application does not have a corresponding historical learning result, setting a first slot offset value and a second slot offset value, recording a delay indicator corresponding to the first slot offset value in a time T and a delay indicator corresponding to the second slot offset value in the time T; determining whether a first ratio is less than a preset first threshold, where the first ratio is a ratio of a difference between absolute values of the delay indicator corresponding to the first slot offset value and the delay indicator corresponding to the second slot offset value to a smaller value of the delay indicator corresponding to the first slot offset value and the delay indicator corresponding to the second slot offset value; and if the first ratio is less than the preset first threshold, determining that the minimum slot offset value is greater than 0; or if the first ratio is greater than or equal to the preset first threshold, determining that the minimum slot offset value is equal to 0. When the first ratio is less than the preset first threshold, it indicates that a deviation between the delay indicator corresponding to the first slot offset value and the delay indicator corresponding to the second slot offset value is relatively small, and it may be inferred that the foreground APP is insensitive to a delay of cross-slot scheduling. To save power consumption, a value of the expected K0 (that is, a minimum K0 value expected by the UE) of the foreground APP may be set to a non-zero value; otherwise, the value of the expected K0 is set to 0. In this way, a delay requirement of an application running in the foreground of the terminal device can be met.

In a possible implementation, if the preset condition includes that the related parameter of the terminal device changes, the determining, by the terminal device, a minimum slot offset value in response to the preset condition being met includes: determining, by the terminal device, the minimum slot offset value based on the parameter indicating whether the screen of the terminal device is on or off, and if the screen of the terminal device is off, determining that the minimum slot offset value is greater than 0, or if the screen of the terminal device is on, determining that the minimum slot offset value is equal to 0; or determining, by the terminal device, the minimum slot offset value based on the parameter indicating whether the terminal device is being charged, and if the terminal device is being charged, determining that the minimum slot offset value is equal to 0; or determining, by the terminal device, the minimum slot offset value based on the working mode of the terminal device, and if the terminal device is in a low-power mode or a low-power-consumption mode, determining that the minimum slot offset value is greater than 0, or if the terminal device is in a performance mode, determining that the minimum slot offset value is equal to 0; or determining, by the terminal device, the minimum slot offset value based on the remaining battery power of the terminal device, and if the remaining battery power of the terminal device is less than a second threshold, determining that the minimum slot offset value is greater than 0, or if the remaining battery power of the terminal device is greater than a third threshold, determining that the minimum slot offset value is equal to 0; or determining, by the terminal device, the minimum slot offset value based on the power loss speed of the terminal device, and if the power loss speed of the terminal device is greater than a fourth threshold, determining that the minimum slot offset value is greater than 0, or if the power loss speed of the terminal device is less than a fifth threshold, determining that the minimum slot offset value is equal to 0; or determining, by the terminal device, the minimum slot offset value based on the network parameter that affects power consumption of the terminal device; and if a first condition is met, determining that the minimum slot offset value is greater than 0, where the first condition includes at least one of the following cases: a current network supports BWP, a current network supports CDRX, and an uplink pre-scheduling ratio is less than a sixth threshold; or if the first condition is not met, determining that the minimum slot offset value is equal to 0; or determining, by the terminal device, the minimum slot offset value based on the temperature of the terminal device, and if the temperature of the terminal device is greater than a seventh threshold, determining that the minimum slot offset value is greater than 0; or determining, by the terminal device, the minimum slot offset value based on the parameter indicating whether the screen of the terminal device is on or off and the working mode of the terminal device; and if the screen of the terminal device is off and the terminal device is in a low-power mode or a low-power-consumption mode, determining that the minimum slot offset value is greater than 0; or if the screen of the terminal device is on and the terminal device is in a performance mode, determining that the minimum slot offset value is equal to 0; or determining, by the terminal device, the minimum slot offset value based on the parameter indicating whether the screen of the terminal device is on or off, the working mode of the terminal device, and the remaining battery power of the terminal device; and if the screen of the terminal device is off, the terminal device is in a low-power mode or a low-power-consumption mode, and the remaining battery power of the terminal device is less than a second threshold, determining that the minimum slot offset value is greater than 0; or if the screen of the terminal device is on, the terminal device is in a performance mode, and the remaining battery power of the terminal device is greater than a third threshold, determining that the minimum slot offset value is equal to 0. In this way, a delay requirement posed after a related parameter of the terminal device changes can be met.

In a possible implementation, if the preset condition includes a packet sparsity change, that the terminal device determines a minimum slot offset value in response to meeting the preset condition includes: when the data packet sparsity is used to indicate a quantity of uplink and downlink packets transmitted at the application layer per second and/or a quantity of uplink and downlink bytes per second, if the quantity of uplink and downlink packets transmitted per second is less than an eighth threshold and the quantity of uplink and downlink bytes per second is less than a ninth threshold, determining that the minimum slot offset value is greater than 0; or if the quantity of uplink and downlink packets transmitted per second is greater than a tenth threshold or the quantity of uplink and downlink packets transmitted per second is greater than an eleventh threshold, determining that the minimum slot offset value is equal to 0; or when the data packet sparsity is used to indicate a quantity of uplink and downlink physical address layer user packet data units and/or a quantity of uplink and downlink physical address layer bytes transmitted every 100 milliseconds at the physical address layer, if the quantity of uplink and downlink physical address layer user packet data units transmitted every 100 milliseconds is less than a twelfth threshold, and the quantity of uplink and downlink physical address layer bytes transmitted every 100 milliseconds is less than a thirteenth threshold, determining that the minimum slot offset value is greater than 0; or if the quantity of uplink and downlink physical address layer user packet data units transmitted every 100 milliseconds is greater than a fourteenth threshold, or the quantity of uplink and downlink physical address layer bytes transmitted every 100 milliseconds is greater than a fifteenth threshold, determining that the minimum slot offset value is equal to 0; or when the data packet sparsity is used to indicate a quantity of downlink scheduling times transmitted at the physical layer every 100 milliseconds, if the quantity of downlink scheduling times transmitted every 100 milliseconds is less than a sixteenth threshold, determining that the minimum slot offset value is greater than 0; or if the quantity of downlink scheduling times transmitted every 100 milliseconds is greater than a seventeenth threshold, determining that the minimum slot offset value is equal to 0. In this way, a delay requirement posed after the data packet sparsity changes can be met.

In a possible implementation, if the preset condition includes that the network environment parameter changes, the determining, by the terminal device, a minimum slot offset value in response to the preset condition being met includes: when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, and a variation amplitude of the RSRQ is greater than a twenty-third threshold, determining that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, and a variation amplitude of the RSRQ is less than a twenty-ninth threshold, determining that the minimum slot offset value is greater than 0. In this way, a delay requirement posed after the network environment parameter is changed can be met.

In a possible implementation, before the sending, by the terminal device, assistance information, the method further includes: receiving, by the terminal device, a capability query message sent by a network device, where the capability query message is used to query a capability of the terminal device; sending, by the terminal device, capability information to the network device, where the capability information includes information used to indicate that the terminal device supports cross-slot scheduling; and receiving, by the terminal device, a radio resource control RRC reconfiguration message from the network device, where the RRC reconfiguration message includes an information element used to enable a capability of the terminal device to modify a minimum slot offset value.

In a possible implementation, the minimum slot offset value determined by the terminal device includes a minimum K0 value. The minimum K0 value is used to indicate a time interval between the PDCCH and the PDSCH scheduled by the PDCCH.

The terminal device in this embodiment of this application may be UE, and the network device may be a base station. For related descriptions of other steps in FIG. 11, refer to the foregoing related descriptions. Details are not described herein again.

Based on the method provided in this embodiment of this application, in response to meeting the preset condition, the terminal device may determine the minimum slot offset value, and report the minimum slot offset value to the network device. Therefore, the network device may determine, based on the minimum slot offset value, whether to perform same-slot scheduling or cross-slot scheduling, thereby obtaining a balance between saving power consumption and reducing a delay. In a case in which the delay has a minimum effect on user experience, a lower power consumption is obtained.

Figure 12:
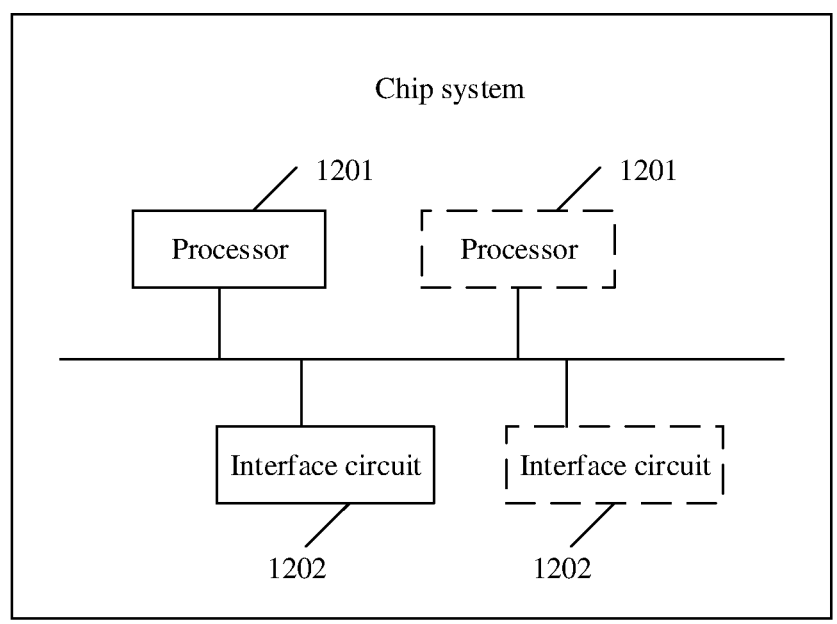
FIG. 12 is a schematic diagram of a chip system according to an embodiment of this application.

The embodiments of this application further provide a chip system. As shown in FIG. 12, the chip system includes at least one processor 1201 and at least one interface circuit 1202. The processor 1201 and the interface circuit 1202 may be interconnected through a line. For example, the interface circuit 1202 may be configured to receive a signal from another apparatus (for example, a memory of an electronic device). For another example, the interface circuit 1202 may be configured to send a signal to another apparatus (for example, the processor 1201).

For example, the interface circuit 1202 may read instructions stored in the memory of the electronic device, and send the instructions to the processor 1201. When the instruction is executed by the processor 1201, the terminal device (the electronic device 100 shown in FIG. 4) or the network device (the network device shown in FIG. 5) may execute steps in the foregoing embodiment.

Certainly, the chip system may further include another discrete component. This is not specifically limited in this embodiment of this application.

An embodiment of this application further provides a computer readable storage medium. The computer readable storage medium includes a computer instruction. When the computer instruction runs on an electronic device (the electronic device 100 shown in FIG. 4) or a network device (the network device shown in FIG. 5), the electronic device 100 performs functions or steps performed by the electronic device in the foregoing method embodiments, and the network device performs functions or steps performed by the network device in the foregoing method embodiments.

The embodiments of this application further provide a computer program product. When the computer program product runs on a computer, the computer is enabled to execute functions or steps executed by the electronic device in the foregoing method embodiments.

An embodiment of this application further provides a processing apparatus, where the processing apparatus may be divided into different logical units or modules according to functions, and each unit or module performs different functions, so that the processing apparatus performs functions or steps performed by a terminal device or a network device in the foregoing method embodiments.

It may be clearly understood by a person skilled in the art from the foregoing description of the implementations that, the foregoing functions may be allocated to different functional modules based on a requirement, that is, an internal structure of the apparatus is divided into different functional modules, so as to complete all or some of the functions described above.

In the embodiments provided in this application, it should be understood that the disclosed apparatuses and methods may be implemented in another manner. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit. The foregoing integrated unit may be implemented in a form of hardware, or may be implemented in a form of a software functional unit.

When an integrated unit is implemented in a form of a software functional unit and sold or used as an independent product, the integrated unit may be stored in a readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a device (which may be a single-chip processor, a chip, or the like) or a processor (processor) to perform all or some of the steps of the methods described in the embodiments of this application. The foregoing storage medium includes any medium that can store program code, for example, a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a minimum slot offset value, comprising:

determining, by a terminal device, whether a preset condition is met, wherein the preset condition comprises at least one of the following: a preset application is opened, a related parameter of the terminal device changes, data packet sparsity changes, or a network environment parameter changes;

determining, by the terminal device, a minimum slot offset value in response to the preset condition being met; and when the minimum slot offset value determined by the terminal device is different from a minimum slot offset value indicated by a cell on which the terminal device currently camps, sending, by the terminal device, assistance information, wherein the assistance information comprises the minimum slot offset value determined by the terminal device, and the minimum slot offset value is used for cross-slot scheduling; and wherein the related parameter of the terminal device comprises at least one of a parameter indicating whether a screen of the terminal device is on or off, a parameter indicating whether the terminal device is being charged, a parameter indicating a working mode of the terminal device, a parameter indicating remaining battery power of the terminal device, a parameter indicating a power loss speed of the terminal device, a parameter indicating a network parameter that affects power consumption of the terminal device, or a parameter indicating a temperature of the terminal device.

2. The method according to claim 1, wherein
the data packet sparsity indicates a quantity of uplink and downlink packets and/or uplink and downlink bytes transmitted at an application layer per second; or the data packet sparsity indicates a quantity of uplink and downlink physical address layer user packet data units and/or a quantity of uplink and downlink physical address layer bytes transmitted every 100 milliseconds at a physical address layer; or the data packet sparsity indicates a quantity of downlink scheduling times transmitted at a physical layer every 100 milliseconds; and
the network environment parameter comprises one or more of reference signal received power (RSRP), a signal to interference plus noise ratio (SINR), or reference signal received quality (RSRQ).

3. The method according to claim 1, wherein the preset condition comprises that the preset application is opened, and the determining, by the terminal device, a minimum slot offset value in response to the preset condition being met comprises:
determining, by the terminal device, the minimum slot offset value based on an application type corresponding to the preset application, wherein the application type comprises a first type or a second type, the first type is corresponding to an application for a first delay requirement, the second type is corresponding to an application for a second delay requirement, and the first delay requirement is higher than the second delay requirement; and
when the type of a first application is the first type, determining that the minimum slot offset value is equal to 0; or when the type of the first application is the second type, determining that the minimum slot offset value is greater than 0.

4. The method according to claim 1, wherein the preset condition comprises that the preset application is opened, and the determining, by the terminal device, a minimum slot offset value in response to the preset condition being met comprises:
determining whether the preset application has a corresponding historical learning result, wherein the historical learning result indicates a minimum slot offset value corresponding to a latest running time of the preset application;
when the preset application does not have a corresponding historical learning result, setting a first slot offset value and a second slot offset value, recording a delay indicator corresponding to the first slot offset value in a time T and a delay indicator corresponding to the second slot offset value in the time T;
determining whether a first ratio is less than a preset first threshold, wherein the first ratio is a ratio of an absolute value of a difference between the delay indicator corresponding to the first slot offset value and the delay indicator corresponding to the second slot offset value to a smaller value of the delay indicator corresponding to the first slot offset value and the delay indicator corresponding to the second slot offset value; and
when the first ratio is less than the preset first threshold, determining that the minimum slot offset value is greater than 0; or when the first ratio is greater than or equal to the preset first threshold, determining that the minimum slot offset value is equal to 0.

5. The method according to claim 1, wherein the preset condition comprises that the related parameter of the terminal device changes, and the determining, by the terminal device, a minimum slot offset value in response to the preset condition being met comprises:
determining, by the terminal device, the minimum slot offset value based on the parameter indicating whether the screen of the terminal device is on or off, and when the screen of the terminal device is off, determining that the minimum slot offset value is greater than 0, or when the screen of the terminal device is on, determining that the minimum slot offset value is equal to 0; or
determining, by the terminal device, the minimum slot offset value based on the parameter indicating whether the terminal device is being charged, and when the terminal device is being charged, determining that the minimum slot offset value is equal to 0; or
determining, by the terminal device, the minimum slot offset value based on the parameter indicating the working mode of the terminal device, and when the terminal device is in a low-power mode or a low-power-consumption mode, determining that the minimum slot offset value is greater than 0, or when the terminal device is in a performance mode, determining that the minimum slot offset value is equal to 0; or
determining, by the terminal device, the minimum slot offset value based on the parameter indicating the remaining battery power of the terminal device, and when the remaining battery power of the terminal device is less than a second threshold, determining that the minimum slot offset value is greater than 0, or when the remaining battery power of the terminal device is greater than a third threshold, determining that the minimum slot offset value is equal to 0; or
determining, by the terminal device, the minimum slot offset value based on the parameter indicating the power loss speed of the terminal device, and when the power loss speed of the terminal device is greater than a fourth threshold, determining that the minimum slot offset value is greater than 0, or when the power loss speed of the terminal device is less than a fifth threshold, determining that the minimum slot offset value is equal to 0; or
determining, by the terminal device, the minimum slot offset value based on the parameter indicating the network parameter that affects power consumption of the terminal device; and when a first condition is met, determining that the minimum slot offset value is greater than 0, wherein the first condition comprises at least one of the following: a current network supports a bandwidth part (BWP), a current network supports connected mode discontinuous reception (CDRX), and an uplink pre-scheduling ratio is less than a sixth threshold; or when the first condition is not met, determining that the minimum slot offset value is equal to 0; or
determining, by the terminal device, the minimum slot offset value based on the parameter indicating the temperature of the terminal device, and when the temperature of the terminal device is greater than a seventh threshold, determining that the minimum slot offset value is greater than 0; or
determining, by the terminal device, the minimum slot offset value based on the parameter indicating whether the screen of the terminal device is on or off and the working mode of the terminal device; and when the screen of the terminal device is off and the terminal device is in a low-power mode or a low-power-consumption mode, determining that the minimum slot offset value is greater than 0; or when the screen of the terminal device is on and the terminal device is in a performance mode, determining that the minimum slot offset value is equal to 0; or determining, by the terminal device, the minimum slot offset value based on the parameter indicating whether the screen of the terminal device is on or off, the working mode of the terminal device, and the remaining battery power of the terminal device; and when the screen of the terminal device is off, the terminal device is in a low-power mode or a low-power-consumption mode, and the remaining battery power of the terminal device is less than a second threshold, determining that the minimum slot offset value is greater than 0; or when the screen of the terminal device is on, the terminal device is in a performance mode, and the remaining battery power of the terminal device is greater than a third threshold, determining that the minimum slot offset value is equal to 0.

6. The method according to claim 1, wherein the preset condition comprises that the data packet sparsity changes, and the determining, by the terminal device, a minimum slot offset value in response to the preset condition being met comprises:

when the data packet sparsity indicates a quantity of uplink and downlink packets transmitted at the application layer per second and/or a quantity of uplink and downlink bytes per second, and when the quantity of uplink and downlink packets transmitted per second is less than an eighth threshold and the quantity of uplink and downlink bytes per second is less than a ninth threshold, determining that the minimum slot offset value is greater than 0; or when the quantity of uplink and downlink packets transmitted per second is greater than a tenth threshold or the quantity of uplink and downlink packets transmitted per second is greater than an eleventh threshold, determining that the minimum slot offset value is equal to 0; or when the data packet sparsity indicates a quantity of uplink and downlink physical address layer user packet data units and/or a quantity of uplink and downlink physical address layer bytes transmitted every 100 milliseconds at the physical address layer, when the quantity of uplink and downlink physical address layer user packet data units transmitted every 100 milliseconds is less than a twelfth threshold, and the quantity of uplink and downlink physical address layer bytes transmitted every 100 milliseconds is less than a thirteenth threshold, determining that the minimum slot offset value is greater than 0; or when the quantity of uplink and downlink physical address layer user packet data units transmitted every 100 milliseconds is greater than a fourteenth threshold, or the quantity of uplink and downlink physical address layer bytes transmitted every 100 milliseconds is greater than a fifteenth threshold, determining that the minimum slot offset value is equal to 0; or when the data packet sparsity indicates a quantity of downlink scheduling times transmitted at the physical layer every 100 milliseconds, when the quantity of downlink scheduling times transmitted every 100 milliseconds is less than a sixteenth threshold, determining that the minimum slot offset value is greater than 0; or when the quantity of downlink scheduling times transmitted every 100 milliseconds is greater than a seventeenth threshold, determining that the minimum slot offset value is equal to 0.

7. The method according to claim 2, wherein the preset condition comprises that the network environment parameter changes, and the determining, by the terminal device, a minimum slot offset value in response to the preset condition being met comprises:

when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, or a variation amplitude of the RSRQ is greater than a twenty-third threshold, determining that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, or a variation amplitude of the RSRQ is less than a twenty-ninth threshold, determining that the minimum slot offset value is greater than 0.

8. The method according to claim 1, wherein before the sending, by the terminal device, assistance information, the method further comprises:

receiving, by the terminal device, a capability query message sent by a network device, wherein the capability query message queries a capability of the terminal device;

sending, by the terminal device, capability information to the network device, wherein the capability information comprises information indicating that the terminal device supports cross-slot scheduling; and receiving, by the terminal device, a radio resource control (RRC) reconfiguration message from the network device, wherein the RRC reconfiguration message comprises an information element used to enable a capability of the terminal device to modify a minimum slot offset value.

9. The method according to claim 1, wherein
the minimum slot offset value determined by the terminal device comprises a minimum K0 value, and the minimum K0 value indicates a time interval between a physical downlink control channel (PDCCH) and a physical downlink shared channel (PDSCH) scheduled by the PDCCH.

10. A terminal device, wherein the terminal device comprises a wireless communications module, a memory, and one or more processors, and the wireless communications module, the memory, and the processor are coupled; and
the memory is configured to store computer program code, the computer program code comprises computer instructions, and when the computer instructions are executed by the processor, the terminal device is enabled to perform the method according to claim 1.

11. A computer-readable storage medium, comprising computer instructions, wherein
when the computer instructions are run on a terminal device, the terminal device is enabled to perform the method according to claim 1.

12. A terminal device, wherein the terminal device comprises a wireless communications module, a memory, and one or more processors, and the wireless communications module, the memory, and the processor are coupled;

the memory is configured to store computer program code, the computer program code comprises computer instructions, and when the computer instructions are executed by the processor, the terminal device is enabled to perform the following steps:

determining whether a preset condition is met, wherein the preset condition comprises at least one of the following: a preset application is opened, a related parameter of the terminal device changes, data packet sparsity changes, or a network environment parameter changes;

determining a minimum slot offset value in response to the preset condition being met; and when the minimum slot offset value determined by the terminal device is different from a minimum slot offset value indicated by a cell on which the terminal device currently camps, sending assistance information, wherein the assistance information comprises the minimum slot offset value determined by the terminal device, and the minimum slot offset value is used for cross-slot scheduling; and wherein the related parameter of the terminal device comprises at least one of a parameter indicating whether a screen of the terminal device is on or off, a parameter indicating whether the terminal device is being charged, a parameter indicating a working mode of the terminal device, a parameter indicating remaining battery power of the terminal device, a parameter indicating a power loss speed of the terminal device, a parameter indicating a network parameter that affects power consumption of the terminal device, or a parameter indicating a temperature of the terminal device.

13. The terminal device according to claim 12, wherein the data packet sparsity indicates a quantity of uplink and downlink packets and/or uplink and downlink bytes transmitted at an application layer per second; or the data packet sparsity indicates a quantity of uplink and downlink physical address layer user packet data units and/or a quantity of uplink and downlink physical address layer bytes transmitted every 100 milliseconds at a physical address layer; or the data packet sparsity indicates a quantity of downlink scheduling times transmitted at a physical layer every 100 milliseconds; and the network environment parameter comprises one or more of reference signal received power (RSRP), a signal to interference plus noise ratio (SINR), and reference signal received quality (RSRQ).

14. The terminal device according to claim 12, wherein the preset condition comprises that the preset application is opened, and the determining a minimum slot offset value in response to the preset condition being met comprises:

determining, by the terminal device, the minimum slot offset value based on an application type corresponding to the preset application, wherein the application type comprises a first type or a second type, the first type is corresponding to an application for a first delay requirement, the second type is corresponding to an application for a second delay requirement, and the first delay requirement is higher than the second delay requirement; and when the type of a first application is the first type, determining that the minimum slot offset value is equal to 0; or when the type of the first application is the second type, determining that the minimum slot offset value is greater than 0.

15. The terminal device according to claim 12, wherein the preset condition comprises that the preset application is opened, and the determining a minimum slot offset value in response to the preset condition being met comprises:

determining whether the preset application has a corresponding historical learning result, wherein the historical learning result indicates a minimum slot offset value corresponding to a latest running time of the preset application;

when the preset application does not have a corresponding historical learning result, setting a first slot offset value and a second slot offset value, recording a delay indicator corresponding to the first slot offset value in a time T and a delay indicator corresponding to the second slot offset value in the time T;

determining whether a first ratio is less than a preset first threshold, wherein the first ratio is a ratio of an absolute value of a difference between the delay indicator corresponding to the first slot offset value and the delay indicator corresponding to the second slot offset value to a smaller value of the delay indicator corresponding to the first slot offset value and the delay indicator corresponding to the second slot offset value; and when the first ratio is less than the preset first threshold, determining that the minimum slot offset value is greater than 0; or when the first ratio is greater than or equal to the preset first threshold, determining that the minimum slot offset value is equal to 0.

16. The terminal device according to claim 12, wherein the preset condition comprises that the related parameter of the terminal device changes, and the determining a minimum slot offset value in response to the preset condition being met comprises:

determining the minimum slot offset value based on the parameter indicating whether the screen of the terminal device is on or off, and when the screen of the terminal device is off, determining that the minimum slot offset value is greater than 0, or when the screen of the terminal device is on, determining that the minimum slot offset value is equal to 0; or determining the minimum slot offset value based on the parameter indicating whether the terminal device is being charged, and when the terminal device is being charged, determining that the minimum slot offset value is equal to 0; or determining the minimum slot offset value based on the working mode of the terminal device, and when the terminal device is in a low-power mode or a low-power-consumption mode, determining that the minimum slot offset value is greater than 0, or when the terminal device is in a performance mode, determining that the minimum slot offset value is equal to 0; or determining the minimum slot offset value based on the remaining battery power of the terminal device, and when the remaining battery power of the terminal device is less than a second threshold, determining that the minimum slot offset value is greater than 0, or when the remaining battery power of the terminal device is greater than a third threshold, determining that the minimum slot offset value is equal to 0; or determining the minimum slot offset value based on the power loss speed of the terminal device, and when the power loss speed of the terminal device is greater than a fourth threshold, determining that the minimum slot offset value is greater than 0, or when the power loss speed of the terminal device is less than a fifth threshold, determining that the minimum slot offset value is equal to 0; or determining the minimum slot offset value based on the network parameter that affects power consumption of the terminal device; and when a first condition is met, determining that the minimum slot offset value is greater than 0, wherein the first condition comprises at least one of the following: a current network supports a bandwidth part (BWP), a current network supports connected mode discontinuous reception (CDRX), and an uplink pre-scheduling ratio is less than a sixth threshold; or when the first condition is not met, determining that the minimum slot offset value is equal to 0; or determining the minimum slot offset value based on the temperature of the terminal device, and when the temperature of the terminal device is greater than a seventh threshold, determining that the minimum slot offset value is greater than 0; or determining the minimum slot offset value based on the parameter indicating whether the screen of the terminal device is on or off and the working mode of the terminal device; and when the screen of the terminal device is off and the terminal device is in a low-power mode or a low-power-consumption mode, determining that the minimum slot offset value is greater than 0; or when the screen of the terminal device is on and the terminal device is in a performance mode, determining that the minimum slot offset value is equal to 0; or determining the minimum slot offset value based on the parameter indicating whether the screen of the terminal device is on or off, the working mode of the terminal device, and the remaining battery power of the terminal device; and when the screen of the terminal device is off, the terminal device is in a low-power mode or a low-power-consumption mode, and the remaining battery power of the terminal device is less than a second threshold, determining that the minimum slot offset value is greater than 0; or when the screen of the terminal device is on, the terminal device is in a performance mode, and the remaining battery power of the terminal device is greater than a third threshold, determining that the minimum slot offset value is equal to 0.

17. The terminal device according to claim 12, wherein the preset condition comprises that the data packet sparsity changes, and the determining a minimum slot offset value in response to the preset condition being met comprises:
when the data packet sparsity indicates a quantity of uplink and downlink packets transmitted at the application layer per second and/or a quantity of uplink and downlink bytes per second, when the quantity of uplink and downlink packets transmitted per second is less than an eighth threshold and the quantity of uplink and downlink bytes per second is less than a ninth threshold, determining that the minimum slot offset value is greater than 0; or when the quantity of uplink and downlink packets transmitted per second is greater than a tenth threshold or the quantity of uplink and downlink packets transmitted per second is greater than an eleventh threshold, determining that the minimum slot offset value is equal to 0; or when the data packet sparsity indicates a quantity of uplink and downlink physical address layer user packet data units and/or a quantity of uplink and downlink physical address layer bytes transmitted every 100 milliseconds at the physical address layer, when the quantity of uplink and downlink physical address layer user packet data units transmitted every 100 milliseconds is less than a twelfth threshold, and the quantity of uplink and downlink physical address layer bytes transmitted every 100 milliseconds is less than a thirteenth threshold, determining that the minimum slot offset value is greater than 0; or when the quantity of uplink and downlink physical address layer user packet data units transmitted every 100 milliseconds is greater than a fourteenth threshold, or the quantity of uplink and downlink physical address layer bytes transmitted every 100 milliseconds is greater than a fifteenth threshold, determining that the minimum slot offset value is equal to 0; or when the data packet sparsity indicates a quantity of downlink scheduling times transmitted at the physical layer every 100 milliseconds, when the quantity of downlink scheduling times transmitted every 100 milliseconds is less than a sixteenth threshold, determining that the minimum slot offset value is greater than 0; or when the quantity of downlink scheduling times transmitted every 100 milliseconds is greater than a seventeenth threshold, determining that the minimum slot offset value is equal to 0.

18. The terminal device according to claim 13, wherein the preset condition comprises that the network environment parameter changes, and the determining a minimum slot offset value in response to the preset condition being met comprises:
when at least one of the following is met: the RSRP is less than an eighteenth threshold, the SINR is less than a nineteenth threshold, the RSRQ is less than a twentieth threshold, a variation amplitude of the RSRP is greater than a twenty-first threshold, a variation amplitude of the SINR is greater than a twenty-second threshold, or a variation amplitude of the RSRQ is greater than a twenty-third threshold, determining that the minimum slot offset value is equal to 0; or when at least one of the following is met: the RSRP is greater than a twenty-fourth threshold, the SINR is greater than a twenty-fifth threshold, the RSRQ is greater than a twenty-sixth threshold, a variation amplitude of the RSRP is less than a twenty-seventh threshold, a variation amplitude of the SINR is less than a twenty-eighth threshold, or a variation amplitude of the RSRQ is less than a twenty-ninth threshold, determining that the minimum slot offset value is greater than 0.

19. The terminal device according to claim 12, wherein when the computer instructions are executed by the processor, the terminal device is further enabled to perform the following steps:
receiving a capability query message sent by a network device, wherein the capability query message is used to query a capability of the terminal device;
sending capability information to the network device, wherein the capability information comprises information indicating that the terminal device supports cross-slot scheduling; and
receiving a radio resource control (RRC) reconfiguration message from the network device, wherein the RRC reconfiguration message comprises an information element used to enable a capability of the terminal device to modify a minimum slot offset value.

20. The terminal device according to claim 12, wherein the minimum slot offset value determined by the terminal device comprises a minimum K0 value, and the minimum K0 value indicates a time interval between a physical downlink control channel (PDCCH) and a physical downlink shared channel (PDSCH) scheduled by the PDCCH.

* * * * *